(12) United States Patent
Hajji

(10) Patent No.: US 7,188,212 B2
(45) Date of Patent: Mar. 6, 2007

(54) METHOD AND SYSTEM FOR STORING DATA IN AN ARRAY OF STORAGE DEVICES WITH ADDITIONAL AND AUTONOMIC PROTECTION

(75) Inventor: Amine M. Hajji, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 10/842,047

(22) Filed: May 6, 2004

(65) Prior Publication Data

US 2005/0251619 A1 Nov. 10, 2005

(51) Int. Cl.
*G06F 12/16* (2006.01)

(52) U.S. Cl. .................. 711/114; 711/161; 711/162

(58) Field of Classification Search .................. None
See application file for complete search history.

(56) References Cited

U.S. PATENT DOCUMENTS

| | | | |
|---|---|---|---|
| 5,265,098 A | 11/1993 | Mattson et al. | |
| 5,392,290 A | 2/1995 | Brown et al. | |
| 5,537,567 A | 7/1996 | Galbraith et al. | |
| 5,666,512 A | 9/1997 | Nelson et al. | |
| 5,737,344 A | 4/1998 | Belser et al. | |
| 5,896,493 A | 4/1999 | Rao | |
| 5,974,503 A | 10/1999 | Venkatesh et al. | |
| 5,991,411 A | 11/1999 | Kaufman et al. | |
| 5,991,804 A | 11/1999 | Bolosky et al. | |
| 6,023,780 A | 2/2000 | Iwatani | |
| 6,101,615 A | 8/2000 | Lyons | |
| 6,138,125 A | 10/2000 | DeMoss | |
| 6,219,752 B1 | 4/2001 | Sekido | |
| 6,253,300 B1 | 6/2001 | Lawrence et al. | |
| 6,321,345 B1 | 11/2001 | Mann et al. | |
| 6,353,895 B1 | 3/2002 | Stephenson | |
| 6,513,093 B1 | 1/2003 | Chen et al. | |
| 6,526,478 B1 | 2/2003 | Kirby | |
| 6,546,499 B1 * | 4/2003 | Challener et al. | ............... 714/6 |
| 6,792,391 B1 | 9/2004 | Nanda | |
| 6,934,803 B2 * | 8/2005 | Soulier et al. | ............... 711/114 |
| 2002/0133681 A1 | 9/2002 | McBrearty et al. | |

(Continued)

FOREIGN PATENT DOCUMENTS

JP 2000039970 2/2000

OTHER PUBLICATIONS

PCT International Searching Authority, "Notification of transmittal of the international search report . . . ", Int. App. No. PCT/EP2005/051862, May 22, 2006, 1 p., WIPO, Geneva.

(Continued)

*Primary Examiner*—T Nguyen
(74) *Attorney, Agent, or Firm*—Timothy N. Ellis

(57) ABSTRACT

One aspect of the invention is a method for storing data in an array of storage devices. An example of the method includes writing a first strip to a first storage device and a second storage device. This example also includes writing a second strip to the second storage device and a third storage device. This example further includes writing a third strip to a third storage device and a fourth storage device.

32 Claims, 13 Drawing Sheets

LBA Mapping Table for 1 Rotated Copy
Reserved Band + FIFO Algorithm
(Reserved LBAs 1, 2, ... m, table shows case for m = 10)

| Counter | Random new incoming strip LBAs from Host | Mapped strip LBAs within a reserved LBA band plus FIFO algorithm for non reserved LBAs | Mapped rotated copy LBA | Copy Flag (Y/N) |
|---|---|---|---|---|
| 1 | LBA 33 | LBA 21 | LBA 22 | YES |
| 2 | LBA N-7 | LBA 23 | LBA 24 | YES |
| 3 | LBA N-1 | LBA 25 | LBA 26 | YES |
| 4 | LBA 3 | LBA 5 | LBA 6 | YES |
| 5 | LBA N-88 | LBA 27 | LBA 28 | YES |
| 6 | LBA 9 | LBA 17 | LBA 18 | YES |
| | LBA 1 | LBA 1 | LBA 2 | YES |
| . | . | | | |
| . | . | | | |
| N/2 | LBA YY | LBA XX | LBA XX+1 | YES |
| N/2+1 | LBA 42 | LBA 22 | NA (copy overwritten) | NO |
| | LBA 50 | LBA 24 | NA | NO |
| | LBA 2 | LBA 3 | NA | NO |
| | LBA N-25 | LBA 28 | NA | NO |
| | LBA 22 | LBA 30 | NA | NO |
| . | | | | |
| N-3 | LBA N-73 | LBA N-6 | NA | NO |
| N-2 | LBA 30 | LBA N-4 | NA | NO |
| N-1 | LBA 7 | LBA 13 | NA | NO |
| N | LBA 100 | LBA N | NA | NO |

U.S. PATENT DOCUMENTS

2003/0033477 A1\* 2/2003 Johnson et al.
2003/0120869 A1 6/2003 Lee et al.
2003/0231183 A1 12/2003 Ning et al.
2003/0236944 A1 12/2003 Thompson et al.
2004/0190183 A1 9/2004 Tamal et al.
2005/0155029 A1 7/2005 Nguyen et al.

OTHER PUBLICATIONS

PCT International Searching Authority, "International Search Report", Int. App. No. PCT/EP2005/051862, mailed May 22, 2006, 4 pages, WIPO, Geneva.

PCT International Searching Authority, "Written opinion of the international searching authority", Int. App. No. PCT/EP2005/051862, mailed May 22, 2006, 6 pages, WIPO, Geneva.

Chen et al., "Optimal Data Allotment to Build High Availability and High Performance Disk Arrays", IBM Tech. Disclosure Bulletin, May 1994, pp. 75-79, vol. 37 No. 5, IBM, NY.

"Hybrid Reducdancy Direct-Access Storage Device Array with Design Options", IBM Technical Disclosure Bulletin, Feb. 1994, pp. 141-148, vol. 37, No. 02B, IBM Corporation, Armonk.

\* cited by examiner

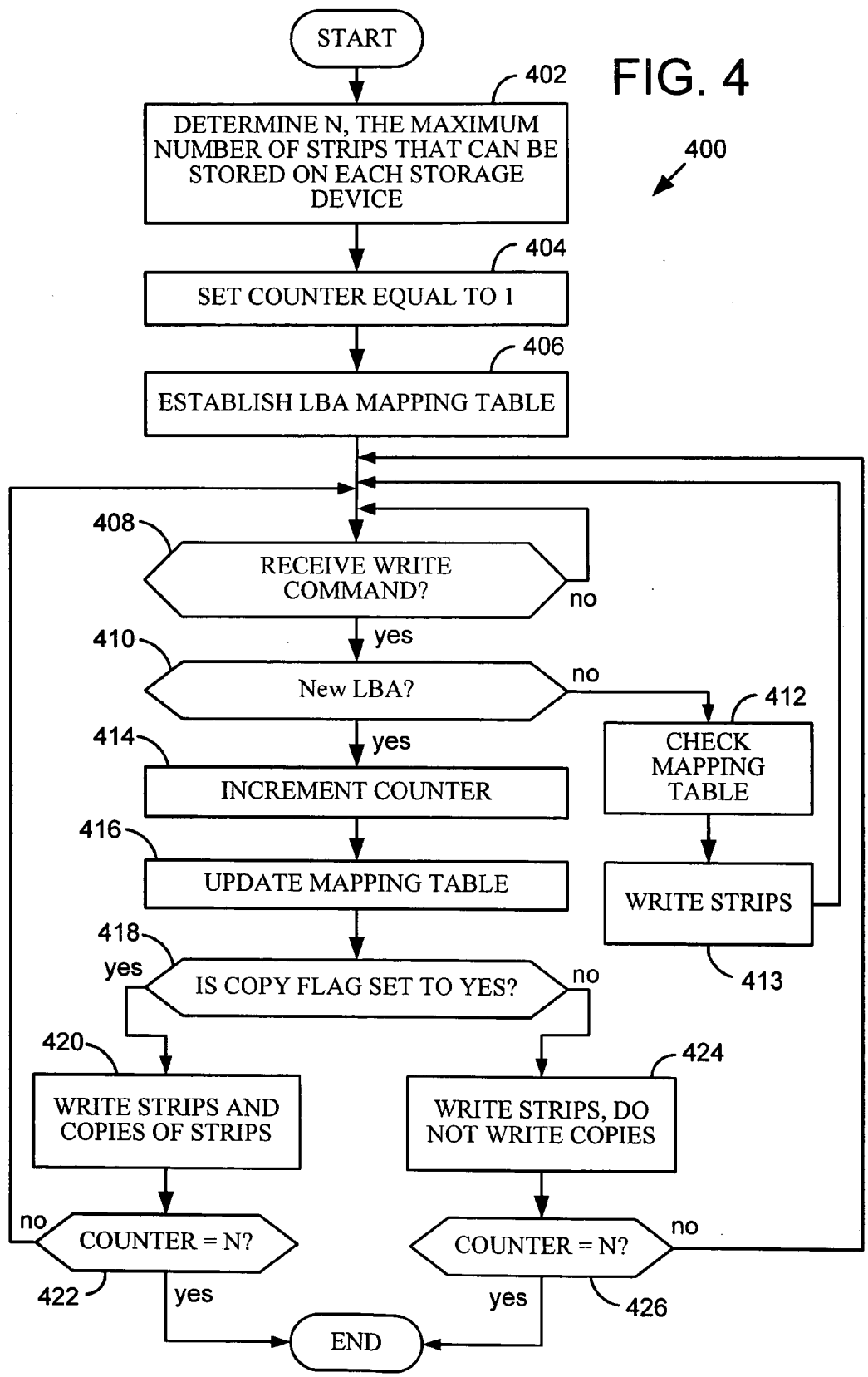

Write + Rotated Copy of stride Sj for a 5 disk array

|  | LBA | Disk 1 | Disk 2 | Disk 3 | Disk 4 | Disk 5 |
|---|---|---|---|---|---|---|
| Strip | LBAm | s1j | s2j | s3j | s4j | s5j |
| Rotated Copy | LBAm+1 | s5j | s1j | s2j | s3j | s4j |

FIG. 5

LBA Mapping Table for 1 Rotated Copy
FIFO Algorithm

| Counter | Random new incoming strip LBAs from Host | Mapped strip LBA using FIFO algorithm | Mapped rotated copy LBA | Copy Flag (Y/N) |
|---|---|---|---|---|
| 1 | LBA 21 | LBA 1 | LBA 2 | YES |
| 2 | LBA N-7 | LBA 3 | LBA 4 | YES |
| 3 | LBA N-1 | LBA 5 | LBA 6 | YES |
| 4 | LBA 4 | LBA 7 | LBA 8 | YES |
| 5 | LBA N-88 | LBA 9 | LBA 10 | YES |
| 6 | LBA N | LBA 11 | LBA 12 | YES |
|  | LBA 1 | LBA 13 | LBA 14 | YES |
| . | . |  |  |  |
| . | . |  |  |  |
| N/2 | LBA 15 | LBA (N-1) | LBA N | YES |
| N/2+1 | LBA 42 | LBA 2 | NA (copy overwritten) | NO |
|  | LBA 50 | LBA 4 | NA | NO |
|  |  | LBA 6 | NA | NO |
|  | LBA N-25 | LBA 8 | NA | NO |
|  | LBA 22 | LBA 10 | NA | NO |
| . |  |  |  |  |
| . |  |  |  |  |
| N-3 | LBA N-73 | LBA N-6 | NA | NO |
| N-2 | LBA 30 | LBA N-4 | NA | NO |
| N-1 | LBA 6 | LBA N-2 | NA | NO |
| N | LBA 100 | LBA N | NA | NO |

FIG. 6

Write + 2 Rotated Copies of stride Sj for a 5 disk array

|  | LBA | Disk 1 | Disk 2 | Disk 3 | Disk 4 | Disk 5 |
|---|---|---|---|---|---|---|
| Strip | LBAm | s1j | s2j | s3j | s4j | s5j |
| Rotated Copy #1 | LBAm+1 | s5j | s1j | s2j | s3j | s4j |
| Rotated Copy #2 | LBAm+2 | s4j | s5j | s1j | s2j | s3j |

FIG. 7

LBA Mapping Table for 2 Rotated Copies
FIFO Algorithm

| Counter | Random new strip LBAs from Host | Mapped strip LBA using FIFO algorithm | Mapped rotated copy #1 LBA | Copy #1 flag | Mapped rotated copy #2 LBA | Copy #2 flag |
|---|---|---|---|---|---|---|
| 1 | LBA 41 | LBA 1 | LBA 2 | YES | LBA 3 | YES |
| 2 | LBA N-76 | LBA 4 | LBA 5 | YES | LBA 6 | YES |
| 3 | LBA N-1 | LBA 7 | LBA 8 | YES | LBA 9 | YES |
| 4 | LBA 4 | LBA 10 | LBA 11 | YES | LBA 12 | YES |
| 5 | LBA N-4 | LBA 13 | LBA 14 | YES | LBA 15 | YES |
| ... | ... | ... | ... | ... | ... | ... |
| ... | ... | ... | ... | ... | ... | ... |
| N/3 (integer) | LBA 101 | LBA 3 | NA | NO | NA | NO |
| N/3+1 | LBA 7 | LBA 6 | NA | NO | NA | NO |
| N/3+2 | LBA 311 | LBA 9 | NA | NO | NA | NO |
| N/3+3 | LBA 867 | LBA 12 | NA | NO | NA | NO |
| N/3+4 | LBA 2 | LBA 15 | NA | NO | NA | NO |
| ... | ... | ... | ... | ... | ... | ... |
| ... | ... | ... | ... | ... | ... | ... |
| 2N/3 (integer) | LBA 12 | LBA 2 | NA | NO | NA | NO |
| 2N/3+1 | LBA N | LBA 5 | NA | NO | NA | NO |
| 2N/3+2 | LBA 1 | LBA 8 | NA | NO | NA | NO |
| 2N3+3 | LBA N-43 | LBA 11 | NA | NO | NA | NO |
| 2N3+4 | LBA 366 | LBA 14 | NA | NO | NA | NO |
|  |  |  |  |  |  |  |
| ... | ... | ... | ... | ... | ... | ... |
| ... | ... | ... | ... | ... | ... | ... |
| N-2 | LBA 479 | LBA 2N/3-5 | NA | NO | NA | NO |
| N-1 | LBA 174 | LBA 2N/3-2 | NA | NO | NA | NO |
| N | LBA 9 | LBA 2N/3+1 | NA | NO | NA | NO |

FIG. 8

Reserved LBA Band Mapping
(Reserved LBAs 1-m, table shows case for m = 10)

| Reserved band of incoming strip LBAs | Mapped strip LBA | Rotated Copy LBA if counter is no greater than N/2 |
|---|---|---|
| LBA 1 | LBA 1 | LBA 2 |
| LBA 2 | LBA 3 | LBA 4 |
| LBA 3 | LBA 5 | LBA 6 |
| LBA 4 | LBA 7 | LBA 8 |
| LBA 5 | LBA 9 | LBA 10 |
| LBA 6 | LBA 11 | LBA 12 |
| LBA 7 | LBA 13 | LBA 14 |
| LBA 8 | LBA 15 | LBA 16 |
| LBA 9 | LBA 17 | LBA 18 |
| LBA 10 | LBA 19 | LBA 20 |
| ... | ... | ... |
| ... | ... | ... |
| ... | ... | ... |
| LBA k | LBA 2k-1 | LBA 2k |

FIG. 9

LBA Mapping Table for 1 Rotated Copy
Reserved Band + FIFO Algorithm
(Reserved LBAs 1, 2, ... m, table shows case for m = 10)

| Counter | Random new incoming strip LBAs from Host | Mapped strip LBAs within a reserved LBA band plus FIFO algorithm for non reserved LBAs | Mapped rotated copy LBA | Copy Flag (Y/N) |
|---|---|---|---|---|
| 1 | LBA 33 | LBA 21 | LBA 22 | YES |
| 2 | LBA N-7 | LBA 23 | LBA 24 | YES |
| 3 | LBA N-1 | LBA 25 | LBA 26 | YES |
| 4 | LBA 3 | LBA 5 | LBA 6 | YES |
| 5 | LBA N-88 | LBA 27 | LBA 28 | YES |
| 6 | LBA 9 | LBA 17 | LBA 18 | YES |
|   | LBA 1 | LBA 1 | LBA 2 | YES |
| . |   |   |   |   |
| . |   |   |   |   |
| N/2 | LBA YY | LBA XX | LBA XX+1 | YES |
| N/2+1 | LBA 42 | LBA 22 | NA (copy overwritten) | NO |
|   | LBA 50 | LBA 24 | NA | NO |
|   | LBA 2 | LBA 3 | NA | NO |
|   | LBA N-25 | LBA 28 | NA | NO |
|   | LBA 22 | LBA 30 | NA | NO |
| . |   |   |   |   |
| . |   |   |   |   |
| N-3 | LBA N-73 | LBA N-6 | NA | NO |
| N-2 | LBA 30 | LBA N-4 | NA | NO |
| N-1 | LBA 7 | LBA 13 | NA | NO |
| N | LBA 100 | LBA N | NA | NO |

FIG. 10

SIX DISK ARRAY WITH RAID 5 AND SINGLE SHIFTED COPY

| A1 | A'p | | A2 | A'1 | | A3 | A'2 | | A4 | A'3 | | A5 | A'4 | | Ap | A'5 |
|----|-----|--|----|-----|--|----|-----|--|----|-----|--|----|-----|--|----|-----|
| Bp | B'5 | | B1 | B'p | | B2 | B'1 | | B3 | B'2 | | B4 | B'3 | | B5 | B'4 |
| C5 | C'4 | | Cp | C'5 | | C1 | C'p | | C2 | C'1 | | C3 | C'2 | | C4 | C'3 |
| ... |    | | ... |    | | ... |    | | ... |    | | ... |    | | ... |    |
|    |     | |    |     | |    |     | |    |     | |    |     | |    |     |

FIG. 12

REBUILD AFTER ONE DISK FAILURE WITHOUT USING PARITY

| A1 | A'p | | A2 | A'1 | | A3 | A'2 | | A4 | A'3 | | A5 | A'4 | | Ap | A'5 |
|----|-----|--|----|-----|--|----|-----|--|----|-----|--|----|-----|--|----|-----|
| Bp | B'5 | | B1 | B'p | | B2 | B'1 | | B3 | B'2 | | B4 | B'3 | | B5 | B'4 |
| C5 | C'4 | | Cp | C'5 | | C1 | C'p | | C2 | C'1 | | C3 | C'2 | | C4 | C'3 |
| ... |    | | ... |    | | ... |    | | ... |    | | ... |    | | ... |    |

FAILED
                HDD

| A1 | A'p | | A2 | A'1 | | A3 | A'2 | | A4 | A'3 | | A5 | A'4 | | Ap | A'5 |
|----|-----|--|----|-----|--|----|-----|--|----|-----|--|----|-----|--|----|-----|
| Bp | B'5 | | B1 | B'p | | B2 | B'1 | | B3 | B'2 | | B4 | B'3 | | B5 | B'4 |
| C5 | C'4 | | Cp | C'5 | | C1 | C'p | | C2 | C'1 | | C3 | C'2 | | C4 | C'3 |
| ... |    | | ... |    | | ... |    | | ... |    | | ... |    | | ... |    |

SPARE
                HDD

FIG. 13

REBUILD AFTER TWO NON-ADJACENT DISK FAILURES WITHOUT USING PARITY

| A1 | A'p |  | A2 | A'1 |  | A3 | A'2 |  | A4 | A'3 |  | A5 | A'4 |  | Ap | A'5 |
|----|-----|---|----|-----|---|----|-----|---|----|-----|---|----|-----|---|----|-----|
| Bp | B'5 |  | B1 | B'p |  | B2 | B'1 |  | B3 | B'2 |  | B4 | B'3 |  | B5 | B'4 |
| C5 | C'4 |  | Cp | C'5 |  | C1 | C'p |  | C2 | C'1 |  | C3 | C'2 |  | C4 | C'3 |
| ... |    |  | ... |    |  | ... |    |  | ... |    |  | ... |    |  | ... |    |

FAILED                  FAILED
             HDD                     HDD

| A1 | A'p |  | A2 | A'1 |  | A3 | A'2 |  | A4 | A'3 |  | A5 | A'4 |  | Ap | A'5 |
|----|-----|---|----|-----|---|----|-----|---|----|-----|---|----|-----|---|----|-----|
| Bp | B'5 |  | B1 | B'p |  | B2 | B'1 |  | B3 | B'2 |  | B4 | B'3 |  | B5 | B'4 |
| C5 | C'4 |  | Cp | C'5 |  | C1 | C'p |  | C2 | C'1 |  | C3 | C'2 |  | C4 | C'3 |
| ... |    |  | ... |    |  | ... |    |  | ... |    |  | ... |    |  | ... |    |

SPARE                  SPARE
            HDD1                    HDD2

FIG. 14

METHOD AND SYSTEM FOR STORING DATA IN AN ARRAY OF STORAGE DEVICES WITH ADDITIONAL AND AUTONOMIC PROTECTION

BACKGROUND

1. Technical Field

The present invention relates to storing data in a computing system. More particularly, some examples of the invention concern storing data in array of storage devices in a manner that provides enhanced protection from data loss.

2. Description of Related Art

Important data is often stored in storage devices in computing systems. Because storage devices can fail and data in failed storage devices can be lost, techniques have been developed for preventing data loss and restoring data when one or more storage devices fail.

One technique for preventing data loss comprises storing parity information on a storage device (such as a disk drive), which is a member of a storage array, and storing customer data on one or more of the other remaining storage devices in the array. (Herein a disk drive may be referred to as a "disk", which is a simplification in common use.) With this technique, if a storage device fails, parity information can be used to reconstruct the data that was on the failed storage device. Moreover, if sufficient parity information is added to another storage device, the additional parity information may be used to reconstruct data from more than one failed storage device. Another technique for preventing data loss, called data mirroring, comprises making a duplicate copy of data on a separate storage device. If a storage device fails, data can be restored from the copy of the data.

A Redundant Array of Inexpensive (or Independent) Disks (RAID), may be used to provide a data storage system that has increased performance and capacity. Data mirroring and parity information storage, or a combination of the two, may be implemented on a RAID array to provide data protection. Also, a technique called striping may be utilized, wherein data records and parity information are divided into strips such that the number of strips equals the number of disks in the array. Each strip is written or "striped" to each of the different disks in the RAID array to balance the load across the disks and to improve performance. A group of strips comprising one pass across all of the drives in a RAID is called a stride. Several RAID protocols have been devised, wherein different mirroring, parity, and striping arrangements are employed. As an example, in a RAID 5 array consisting of six disks, five data strips and one parity strip are striped across the six disks, with the parity information rotated across the disks. The rotation of the parity across the disks ensures that parity updates to the array are shared across the disks. RAID 5 provides a redundancy of one, which means that all data can be recovered if any one and only one of the disks in the array fails.

Although techniques are known for providing greater storage device redundancy to permit data recovery after the failure of more than one storage device, these techniques generally require storing additional parity information on additional storage devices (for example, by using higher Hamming codes), or require additional mirroring on additional storage devices. RAID 6 has an arrangement similar to RAID 5, but requires two parity strips in each stride, to provide a redundancy of two. The storage efficiency for a RAID 6 array for the same data storage capacity is lower than for a RAID 5 array, because a RAID 6 array requires an additional disk. Further, reconstructing lost data from parity information can be time consuming. Consequently, known techniques have undesirable capacity and performance tradeoffs that must be weighed against the need for increased fault tolerance and quick data recovery.

SUMMARY

One aspect of the invention is a method for storing data in an array of storage devices. An example of the method includes writing a first strip to a first storage device and a second storage device. This example also includes writing a second strip to the second storage device and a third storage device. This example further includes writing a third strip to a third storage device and a fourth storage device.

Some alternative examples of the method aspect of the invention include striping data strides across a disk array, writing or updating a first strip of the stride on a first disk in the array, writing or updating a second strip on a second disk, and so on for additional strips and disks. The method additionally includes making a copy of each of the strips, rotated by one disk such that the first disk has a copy of the strip of the last disk in the array, and the second disk has a copy of the strip on the first disk, etc.

Other aspects of the invention are described in the sections below, and include, for example, a storage system, and a signal bearing medium tangibly embodying a program of machine-readable instructions executable by a digital processing apparatus to perform operations for storing data in an array of storage devices.

Some examples of the invention advantageously provide higher storage device fault tolerance than is provided by base RAID configurations, without using storage devices other than the storage devices in the base RAID configurations. Thus, some examples of the invention add additional redundancy on top of the base RAID code for a given number of disks, using only the available disk space in the RAID. Additionally, some examples of the invention beneficially provide high fault tolerance during the early usage of a storage device, which is a usage period characterized by high failure rates. Further, some examples of the invention permit data to be recovered quickly. The invention also provides a number of other advantages and benefits, which should be apparent from the following description.

BRIEF DESCRIPTION OF THE DRAWINGS

FIG. 4 is a flowchart of an operational sequence for backing up data in accordance with an example of the invention.

FIG. 5 is a mapping algorithm for providing a rotated copy of strips in a stride in accordance with an example of the invention.

FIG. 6 is a mapping table for providing a rotated copy of strips in a stride in accordance with an example of the invention.

FIG. 7 is a mapping algorithm for providing two rotated copies of strips in a stride in accordance with an example of the invention.

FIG. 8 is a mapping table for providing two rotated copies of strips in a stride in accordance with an example of the invention.

FIG. 9 is an example of reserved LBA band mapping in accordance with an example of the invention.

FIG. 10 is a mapping table using a reserved band and a FIFO algorithm for providing a rotated copy of strips in a stride, in accordance with an example of the invention.

FIG. 12 is a representation of storing data and copies of data in a disk array in accordance with an example of the invention.

FIG. 13 is a representation of a rebuild of data in a disk array in accordance with an example of the invention.

FIG. 14 is a representation of a rebuild of data in a disk array in accordance with an example of the invention.

DETAILED DESCRIPTION

Figure 1:
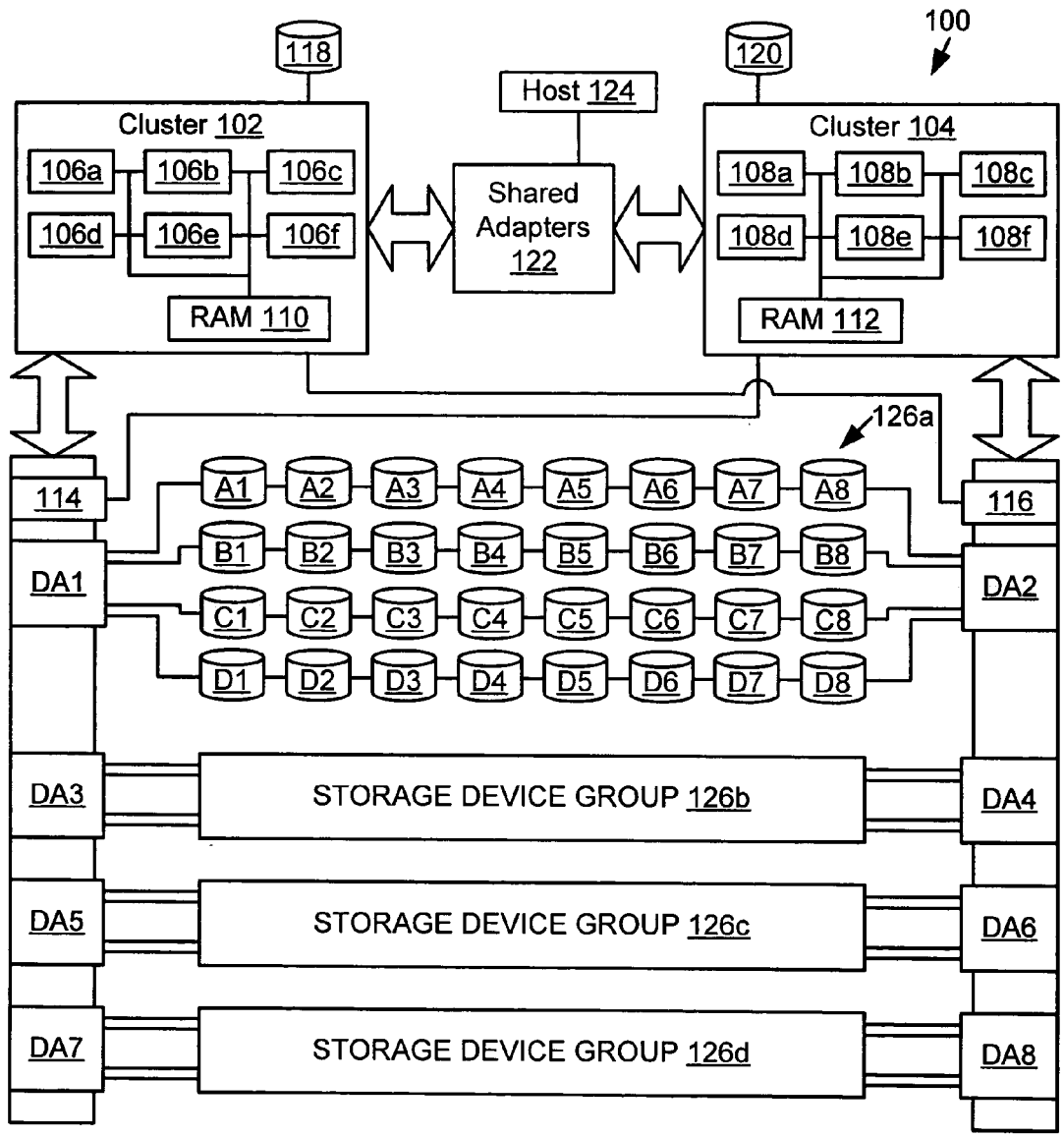
FIG. 1 is a block diagram of the hardware components and interconnections of a storage system in accordance with an example of the invention.

The nature, objectives, and advantages of the invention will become more apparent to those skilled in the art after considering the following detailed description in connection with the accompanying drawings.

I. Hardware Components and Interconnections

One aspect of the invention is a storage system for storing data in an array of storage devices. As an example, the storage system may be embodied by all, or portions of, the storage system 100 shown in FIG. 1. As an example, the storage system 100 may be implemented primarily with a model 800 Enterprise Storage Server (ESS), manufactured by International Business Machines Corporation.

The storage system 100 includes a first cluster 102, and a second cluster 104. In alternative embodiments, the storage system 100 may have a single cluster or more than two clusters. Each cluster has at least one processor. As an example, each cluster may have four or six processors. In the example shown in FIG. 1, the first cluster 102 has six processors 106a, 106b, 106c, 106d, 106e, and 106f, and the second cluster 104 also has six processors 108a, 108b, 108c, 108d, 108e, and 108f. Any processors having sufficient computing power may be used. As an example, each processor 106a–f, 108a–f, may be a PowerPC RISC processor, manufactured by International Business Machines Corporation. The first cluster 102 also includes a first memory 110, and similarly, the second cluster 104 includes a second memory 112. As an example, the memories 110, 112, may be RAM. The memories 110, 112 may be used to store, for example, data, and application programs and other programming instructions executed by the processors 106a–f, 108a–f. The two clusters 102, 104 may be located in a single enclosure or in separate enclosures. In alternative embodiments, each cluster 102, 104 could be replaced with a supercomputer, a mainframe computer, a computer workstation, and/or a personal computer.

The first cluster 102 is coupled to NVRAM 114 (non-volatile random access memory), which is included with a first group of device adapters DA1, DA3, DA5, DA7 (discussed below). Similarly, the second cluster 104 is coupled to NVRAM 116, which is included with a second group of device adapters DA2, DA4, DA6, DA8 (discussed below). Additionally, the first cluster 102 is coupled to the NVRAM 116, and the second cluster 104 is coupled to the NVRAM 114. As an example, data operated on by cluster 102 is stored in memory 110, and is also stored in NVRAM 116, so that if cluster 102 becomes unoperational, the data will not be lost and can be operated on by cluster 104. Similarly, as an example, data operated on by cluster 104 is stored in memory 112, and is also stored in NVRAM 114, so that if cluster 104 becomes unoperational, the data will not be lost and can be operated on by cluster 102. The NVRAM 114, 116 may, for example, be able to retain data for up to about 48 hours without power.

Within the first cluster 102, two or more of the processors 106a–f may be ganged together to work on the same tasks. However, tasks could be partitioned between the processors 106a–f. Similarly, within the second cluster 104, two or more of the processors 108a–f may be ganged together to work on the same tasks. Alternatively, tasks could be partitioned between the processors 108a–f. With regard to the interaction between the two clusters 102, 104, the clusters 102, 104 may act on tasks independently. However, tasks could be shared by the processors 106a–f, 108a–f in the different clusters 102, 104.

The first cluster 102 is coupled to a first boot device, for example first hard drive 118. Similarly, the second cluster 104 is coupled to a second boot device, for example second hard drive 120.

Each of the clusters 102, 104 is coupled to shared adapters 122, which are shared by the clusters 102, 104. The shared adapters 122 can also be called host adapters. The shared adapters 122 may be, for example, PCI slots, and bays hooked to PCI slots, which may be operated by either cluster 102, 104. As an example, the shared adapters 122 may be SCSI, ESCON, FICON, or Fiber Channel adapters, and may facilitate communications with one or more PCs and/or other hosts, such as host 124. As an example, host 124 may be a zSeries server, or a Netfinity server, available from IBM Corporation.

Additionally, the first cluster 102 is coupled to a first group of device adapters DA1, DA3, DA5, DA7, (which may also be called dedicated adapters), and the second cluster 104 is coupled to a second group of device adapters DA2, DA4, DA6, DA8. Each of the device adapters DA1, DA3, DA5, DA7 is an interface between the first cluster 102 and one of the storage device groups 126a, 126b, 126c, 126d, and similarly, each of the device adapters DA2, DA4, DA6, DA8 is an interface between the second cluster 104 and one of the storage device groups 126a, 126b, 126c, 126d. More specifically, device adapters DA1 and DA2 are coupled to storage device group 126a, device adapters DA3 and DA4 are coupled to storage device group 126b, device adapters DA5 and DA6 are coupled to storage device group 126c, and device adapters DA7 and DA8 are coupled to storage device group 126d. In other embodiments, larger or smaller numbers of device adapters DA1–8, and storage device groups 126a–d could be used. The storage device groups 126a–d are shared by the clusters 102, 104. In an alternative embodiment, one or more of the storage device groups could be located at a different site than the first cluster 102 and the second cluster 104.

As an example, each (storage) device adapter DA1–8 may be a Serial Storage Architecture (SSA) adapter. Alternatively, one or more of the device adapters DA1–8 could be implemented with other types of adapters, for example SCSI or Fiber Channel adapters. Each adapter DA1–8 may include software, firmware, and/or microcode, for carrying out one or more examples of the invention or portions of the invention. As an example, Common Parts Interconnect (CPI) may be used to couple each device adapter DA1–8 to a respective cluster 102, 104.

Each pair of device adapters (DA1 and DA2, DA3 and DA4, DA5 and DA6, DA7 and DA8), is coupled to two loops of storage devices. For example, device adapters DA1 and DA2 are coupled to a first loop of storage devices that includes a first string of storage devices A1, A2, A3, A4, A5, A6, A7, A8, and a second string of storage devices B1, B2, B3, B4, B5, B6, B7, B8. The first and second strings of storage devices in a loop will usually have the same number of storage devices, to keep the loop balanced. Similarly, device adapters DA1 and DA2 are also coupled to a second loop of storage devices that includes a first string of storage devices C1, C2, C3, C4, C5, C6, C7, C8, and a second string of storage devices D1, D2, D3, D4, D5, D6, D7, D8. A collection of eight storage devices such as storage devices A1, A2, A3, A4, A5, A6, A7, and A8 may be referred to as an 8-pack. Although not required, a loop will generally have a minimum of sixteen storage devices. In alternative embodiments, larger or smaller numbers of storage devices could be included in each loop. For example, thirty-two, forty-eight, or other numbers of storage devices could be included in each loop. Usually, the strings of storage devices in a loop have equal numbers of storage devices. Each loop of storage devices forms a serial loop with each device adapter that the loop of storage devices is coupled to. For example, the loop of storage devices that includes storage devices A1, A2, A3, A4, A5, A6, A7, A8, and B1, B2, B3, B4, B5, B6, B7, B8 forms a serial loop with device adapter DA1, and also forms a serial loop with device adapter DA2. This arrangement increases reliability because each serial loop provides redundant communication paths between each storage device in the loop and each device adapter coupled to the loop.

The storage devices within each group of storage devices 126a, 126b, 126c, 126d may be grouped into one or more storage device arrays, each of which may be, for example, a Redundant Array of Inexpensive (or Independent) Disks (RAID). RAID arrays may also be called RAID ranks. Responsive to read and write requests received from the first and second clusters 102, 104, (or from host 124), the (storage) device adapters DA1–8 are able to individually address each storage device in the RAID arrays to which they are coupled. The storage devices in a particular RAID array may be in the same loop, or in different loops, between a pair of device adapters. As an example where RAID arrays are made from storage devices that are in a single loop, a first RAID array may include storage devices A1, A2, A3, A4, B1, B2, and B3, and a second RAID array may include storage devices A6, A7, A8, B5, B6, B7, and B8, with storage devices B4 and A5 designated as spares that can be used by either RAID array. In this example, each RAID array includes storage devices from the A1, A2, A3, A4, A5, A6, A7, A8, 8-pack, and from the B1, B2, B3, B4, B5, B6, B7, B8, 8-pack, so that each RAID array is close to one of the device adapters DA1, DA2. As an example where RAID arrays are made from storage devices that are in different loops, a first RAID array may include storage devices A1, A2, B1, B2, C1, C2, and D1, a second RAID array may include storage devices A3, A4, B3, B4, C3, D3, and D4, a third RAID array may include storage devices A5, A6, B6, C5, C6, D5, and D6, and a fourth RAID array may include storage devices A8, B7, B8, C7, C8, D7, and D8, with storage devices D2, C4, B5, and A7 designated as spares that can be used by any of the four RAID arrays. In these examples, RAID arrays and spare storage devices that are available for the RAID arrays, are coupled to the same pair of device adapters. However, a RAID array, and spare storage devices that are available for the RAID array, could be coupled to different pairs of device adapters. Also, a RAID array and spare storage devices that are available for the RAID array may be in a single loop, or in different loops.

Data, and if desired, parity information, may be stored on the storage devices of a RAID array in any desired arrangement, which may include striping and/or mirroring across all, or some, of the storage devices in a RAID array. As an example, six storage devices in a RAID array may be used to store data, and a seventh storage device in the RAID array may be used to store parity information. In another example, seven storage devices in a RAID array may be used to store data, and an eighth storage device in the RAID array may be used to store parity information. As another example, both data and parity information may be stored on all of the storage devices in a RAID array. In other embodiments RAID arrays could have less than seven, or more than eight storage devices. For example, a RAID array could consist of five or six storage devices that are each used to store both data and parity information. Also, double parity information may be stored to permit recovery from a second storage device failure that occurs before completing a rebuild after a first storage device failure. For example, a RAID array could consist of six storage devices that are used to store data, and two storage devices that are used to store parity information. As another example, seven storage devices could be used for data, another seven storage devices could be used to mirror the data on the first seven storage devices, and two more storage devices could be used to store parity information, which all together could provide for recovery from the failure of nine storage devices (a failure tolerance of nine).

The storage devices in the storage device groups 126a–d generally may be any suitable devices for storing data, and may use magnetic, optical, magneto-optical, electrical, or any other suitable technology for storing data. For example, the storage devices could be hard disk drives, optical disks or discs (for example, CD-R, CD-RW, WORM, DVD-R, DVD+R, DVD-RW, or DVD+RW), floppy disks, magnetic data storage disks or diskettes, magnetic tape, digital optical tape, EPROMs, EEPROMs, or flash memory. The storage devices do not each have to be the same type of device or use the same type of technology. As an example, each storage device may be a hard drive, having a capacity, for example, of 146 Giga Bytes. In one example, each storage device group 126a–d may be a storage enclosure in a model 2105 Enterprise Storage Server, manufactured by International Business Machines Corporation.

The first cluster 102 and/or the second cluster 104 together with at least one device adapter DA1–8 and at least a portion of at least one storage device group 126a–d may be referred to as a storage system or storage apparatus. One or more device adapters DA1–8, with or without a portion of at least one storage device group 126a–d, may also be referred to as a storage system or storage apparatus.

Figure 2:
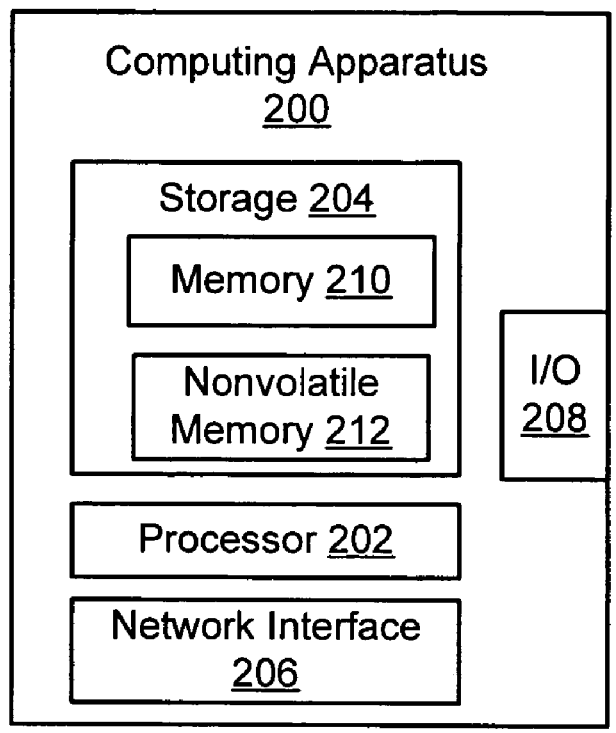
FIG. 2 is a block diagram of the hardware components and interconnections of a computing apparatus in accordance with an example of the invention.

An exemplary computing apparatus 200 is shown in FIG. 2. As an example, host 124, (and in alternative embodiments) cluster 102 and/or cluster 104, could be implemented with an embodiment of the computing apparatus 200. The computing apparatus 200 includes a processor 202 (which may be called a processing device), and in some examples could have more than one processor 202. As an example, the processor may be a PowerPC RISC processor, available from International Business Machines Corporation, or a processor manufactured by Intel Corporation. The processor 202 may run any suitable operating system, for example, Windows 2000, AIX, Solaris™, Linux, UNIX, or HP-UX™. The computing apparatus 200 may be implemented on any suitable computer, for example a personal computer, a workstation, a mainframe computer, or a supercomputer. The computing apparatus 200 also includes a storage 204, a network interface 206, and an input/output 208, which are all coupled to the processor 202. The storage 204 may include a primary memory 210, which for example, may be RAM, and a non volatile memory 212. The non-volatile memory 212 could be, for example, a hard disk drive, a drive for reading and writing from optical or magneto-optical media, a tape drive, non-volatile RAM (NVRAM), or any other suitable type of storage. The storage 204 may be used to store data and application programs and/or other programming instructions executed by the processor. The network interface 206 may provide access to any suitable wired or wireless network or communications link.

II. Operation

In addition to the hardware embodiments described above, other aspects of the invention concern operations for storing data in an array of storage devices.

A. Signal-Bearing Media

In the context of FIGS. 1 and 2, the method aspects of the invention may be implemented, for example, by having one or more of the device adapters DA1–8, cluster 102, and/or cluster 104 (and/or host 124), execute a sequence of machine-readable instructions, which can also be referred to as code. These instructions may reside in various types of signal-bearing media. In this respect, some aspects of the present invention concern a programmed product, comprising a signal-bearing medium or signal-bearing media tangibly embodying a program of machine-readable instructions executable by a digital processing apparatus to perform operations for storing data in an array of storage devices.

Figure 3:
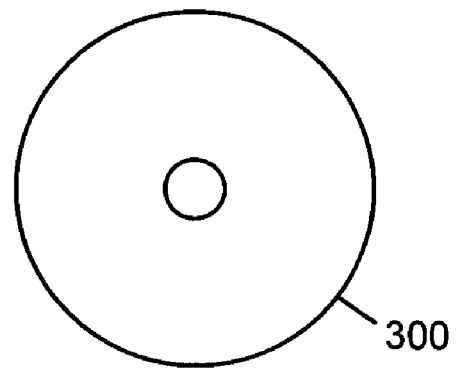
FIG. 3 is an example of a signal-bearing medium in accordance with an example of the invention.

This signal-bearing medium may comprise, for example, RAM 110, RAM 112, NVRAM 114, NVRAM 116, primary memory 210, non-volatile memory 212, and/or firmware in device adapters DA1–8. Alternatively, the instructions may be embodied in a signal-bearing medium such as the optical data storage disc 300 shown in FIG. 3. The optical disc can be any type of signal bearing disc or disk, for example, a CD-ROM, CD-R, CD-RW, WORM, DVD-R, DVD+R, DVD-RW, or DVD+RW. Additionally, whether contained in the storage system 100, or elsewhere, the instructions may be stored on any of a variety of machine-readable data storage mediums or media, which may include, for example, a "hard drive", a RAID array, a magnetic data storage diskette (such as a floppy disk), magnetic tape, digital optical tape, RAM, ROM, EPROM, EEPROM, flash memory, programmable logic, any other type of firmware, magneto-optical storage, paper punch cards, or any other suitable signal-bearing media including transmission media such as digital and/or analog communications links, which may be electrical, optical, and/or wireless. For example, in some embodiments the instructions or code may be accessible from a file server over a network, or from other transmission media, and the signal bearing media embodying the instructions or code may comprise a transmission media, such as a network transmission line, wireless transmission media, signals propagating through space, radio waves, and/or infrared signals. Alternatively, the signal bearing media may be implemented in hardware logic, for example, an integrated circuit chip, a Programmable Gate Array (PGA), or an Application Specific Integrated Circuit (ASIC). As an example, the machine-readable instructions may comprise microcode, or may comprise software object code, compiled from a language such as "C++".

B. Overall Sequence of Operation

1. First Example of Sequence of Operation

For ease of explanation, but without any intended limitation, exemplary method aspects of the invention are described with reference to the storage system 100 described above and shown in FIG. 1. An example of the method aspect of the present invention is illustrated in FIG. 4, which shows a sequence 400 for a method for storing data in an array of storage devices.

Operations of the sequence 400 may be performed by one or more of the device adapters DA1–8, cluster 102, and/or cluster 104 (and/or host 104). Referring to FIG. 4, sequence 400 may include, and may begin with, operation 402. Operation 402 comprises determining, a value "N" for the array, which is the maximum number of strips, identified by their associated Logical Block Addresses (LBAs), that can be stored on each of the storage devices in the array. As an example, the array of storage devices may include some, or all of the storage devices in one or more of the storage device groups 126a–d. As mentioned above, in some examples the storage devices may be hard disk drives.

To determine the maximum number of strips, N, that can be written to storage devices in the array of storage devices, a storage adapter may query each device in the array and then set the number of strips, N, equal to the maximum value that the smallest capacity storage device in the array can support. However, in other examples the storage adapter may limit the maximum value to a smaller value. In most instances all of the storage devices in a RAID array will have the same storage capacity and hence will have the same number of available strip LBAs.

Each strip typically includes a number of blocks of data, wherein each block of data is stored at a corresponding LBA. The LBA of the first block of the strip is called the strip LBA. For example, each strip may include 64 blocks, wherein each block includes, for example, 512 bytes of data. Each block of data in the strip may be addressed at the corresponding strip LBA plus a block offset, where the strip LBA is the address of the first data block of the strip and the offset is the number of blocks from the strip LBA to the target data block LBA. Because the strips typically have a common length, the starting LBA of each strip in a stride will typically have the same value for each storage device in the array. Hence, all data blocks of a stride can be addressed by identifying the target storage device (a disk for example), the strip LBA, and the offset. The phrase "writing to a strip LBA" can be used as a shorthand for describing a write to any or all of the blocks associated with the strip which starts at the given strip LBA.

Sequence 400 may also include operation 404, which comprises setting a counter to an initial value, such as 1, for keeping a count of the number of writes to new LBAs in the array of storage devices.

Sequence 400 may also include operation 406, which comprises establishing a one-to-one mapping between random incoming write LBAs, and ordered LBAs that are written to the storage devices in the array. Operation 406 may comprise setting up a mapping table, which may be based on a mapping algorithm. Setting up a mapping table may also be called designating the mapping table, and may include reserving space in a cache. As an example, a mapping table may be stored in an adapter memory. The adapter memory, may be a nonvolatile memory, so the mapping table will not be lost if the storage device (for example, a disk) is reset.

Establishing the one-to-one mapping between random incoming write LBAs, and ordered LBAs that are written to the storage devices in the array may include using an algorithm that reserves adjacent LBAs for rotated copies. The algorithm illustrated in FIG. 5, is an example of an algorithm for writing data and a single rotated copy of the data in a five disk array. Using such an algorithm, wherein adjacent LBAs are reserved for rotated copies, provides improved read and write efficiency. However, generally any one-to-one mapping algorithm may be used. With regard to FIG. 5, s1$j$, s2$j$, s3$j$, s4$j$ and s5$j$ are the constituent strips of stride Sj, such that Sj=s1$j$+s2$j$+s3$j$+s4$j$+s5$j$. Also, LBAm is the mapped LBA for a stride Sj as determined by the mapping algorithm and table (shown in FIG. 6). With regard to FIG. 5, writing a stride Sj comprises writing to two strip LBAs in each disk, wherein the write to the second LBA is a rotated copy of data that is written to another disk. For example, on disk 1, when writing stride Sj, strip s1$j$ is written starting at LBAm, and a copy of strip s5$j$ is written starting at LBAm+1. On disk 2, strip s2$j$ is written starting at LBAm, and a copy of strip s1$j$ is written starting at LBAm+1. On disk 3, strip s3$j$ is written starting at LBAm, and a copy of strip s2$j$ is written starting at LBAm+1. On disk 4, strip s4$j$ is written starting at LBAm, and a copy of strip s3$j$ is written to LBAm+1. On disk 5, strip s5$j$ is written starting at LBAm, and a copy of strip s4$j$ is written to LBAm+1. The starting LBAs are a function of number of blocks in each strip. As an example, stride 1 could start at LBA 0, and stride 2 could start with LBA 128. FIG. 6 shows a LBA mapping table, based on the algorithm illustrated in FIG. 5, for storing a single rotated copy of each strip in each stride, which uses a first-in-first-out (FIFO) approach for all of the available strip LBAs.

As another example, FIG. 7 shows a mapping algorithm, and FIG. 8 shows a corresponding mapping table, wherein a FIFO approach is used for implementing storage of two rotated copies of data in a five disk array. (In other embodiments, more than two rotated copies could be stored.) Referring to FIG. 7, s1$j$, s2$j$, s3$j$, s4$j$ and s5$j$ are the constituent strips of stride Sj, such that Sj=s1$j$+s2$j$+s3$j$+s4$j$+s5$j$. Also, LBAm is the mapped LBA for stride Sj as determined by the mapping algorithm and table. Referring to FIG. 8, writing a stride Sj comprises writing to three LBAs in each disk, wherein the writes to the second and third LBAs are rotated copies of strips written to other disks. For example, on disk 1, when writing stride Sj, strip s1$j$ is written starting at LBAm, and a copy of strip s5$j$ is written starting at LBAm+1 and a copy of strip s4$j$ is written starting a LBAm+2. On disk 2, strip s2$j$ is written starting at LBAm, and a copy of strip s1$j$ is written starting at LBAm+1 and a copy of strip s5$j$ is written starting at LBAm+2. On disk 3, strip s3$j$ is written starting at LBAm, and a copy of strip s2$j$ is written starting at LBAm+1 and a copy of strip s1$j$ is written starting at LBAm+2. On disk 4, strip s4$j$ is written starting at LBAm, and a copy of strip s3$j$ is written to LBAm+1 and a copy of strip s2$j$ is written starting at LBAm+2. On disk 5, strip s5$j$ is written starting at LBAm, and a copy of strip s4$j$ is written to LBAm+1 and a copy of strip s3$j$ is written starting at LBAm+2.

In another example, the mapping algorithm may reserve a mapped set of LBAs for a band or a set of bands of incoming write LBAs. As an example, the LBAs may be reserved in a fashion so that incoming write LBAs remain close to each other logically. In some examples, the algorithm could be modified for operation with a particular application and/or operating system. In this example wherein a band of LBAs are reserved, LBAs that are not in the reserved band may use, for example, the FIFO approach. FIG. 9 shows an example of a reserved LBA band mapping for the first ten LBAs. FIG. 10 shows a mapping table, for one rotated copy, wherein the reserved mapping of the band of ten LBAs illustrated in FIG. 10, and FIFO mapping, are combined. In this example, the mapping table is updated only when an incoming write LBA is not already in the table. The FIFO algorithm is used for LBAs that are outside of the reserved band. The concept of using reserved bands may be generalized and expanded to include more than one band.

For embodiments wherein the original and one copy of each stride are stored, the operations may also include reserving half of the available LBAs for primary data, and reserving half of the available LBAs for rotated copies of data. For embodiments wherein the original and two copies of each stride are stored, the operations may also include reserving one third of available LBAs for primary data, and reserving two thirds of available LBAs for rotated copies of data. The reservation of storage space may be implicitly carried out by a storage device adapter DA1–8 using a one-to-one mapping algorithm and table, such as the algorithms and tables shown in FIGS. 5–10. In response to a request to write data received from a cluster 102, 104, a storage device adapter DA1–8 may perform the write of the primary copy of the data and any secondary copies, and may also keeps track of what is written and where it is written using the mapping table.

Referring again to FIG. 4, sequence 400 may also include operation 408, which comprises determining if a write command has been received. If a write command has not been received, operation 408 may be repeated until a write command is received. If a write command is received, sequence 400 may also include operation 410, which comprises determining if the write is to a LBA that has not previously been written to (a new LBA). If it is determined that the write is to an LBA that has previously been written to, then the sequence 400 may also include operation 412, which comprises checking a mapping table, and operation 413, which comprises executing the write to write the strips in accordance with the mapping table. Executing the write comprises, for each strip in the stride, writing the strip to the LBA indicated in the mapping table, and if the value of the corresponding copy flag is "yes", also includes writing one or more rotated copies of each strip as indicated in the mapping table.

If in operation 410 it is determined that the write is to an LBA that has not previously been written to, then the sequence 400 may also include operation 414, which comprises incrementing the counter. Sequence 400 may also include operation 416, which comprises updating the mapping table to indicate the mapping between the incoming strip LBA and the mapped strip LBA. Operation 416 may also include setting a "yes" or "no" value for the copy flag for the corresponding entry in the mapping table. Setting a "yes" or "no" value may include determining which value to set. As an example, determining if a copy flag should be set to a "no" value may comprise determining if the counter has a value that is greater than or equal to (which may also be described as "not less than") a no-copy threshold value. As an example, the no-copy threshold value may be a percentage of N, wherein the percentage is a function of a mapping algorithm. For example, for the mapping table in FIG. 6, the copy flag will be set to "no" when the counter reaches a value of N/2+1. Sequence 400 may also include operation 418, which comprises determining if the copy flag is "yes" or "no" for the corresponding value of the counter. If the value of the copy flag is "yes", then the sequence 400 may include operation 420, which comprises, for each strip in the stride, writing the strip and a rotated copy of the strip to the LBAs indicated in the mapping table. Sequence 400 may also include operation 422, which comprises determining if the counter has a value equal to N, and if so, the sequence may end, and if not, the sequence may continue at operation 408.

If in operation 418 it is determined that the copy flag has a value of "no" for the corresponding value of the counter, then the sequence 400 may also include operation 424, which comprises, for each strip in the stride, writing the strip to the LBA indicated in the mapping table, without writing any copies of the strips. Sequence 400 may also include operation 426, which comprises determining if the counter has a value equal to N, and if so, the sequence may end, and if not, the sequence may continue at operation 408.

2. Second Example of Sequence of Operation

Figure 11A:
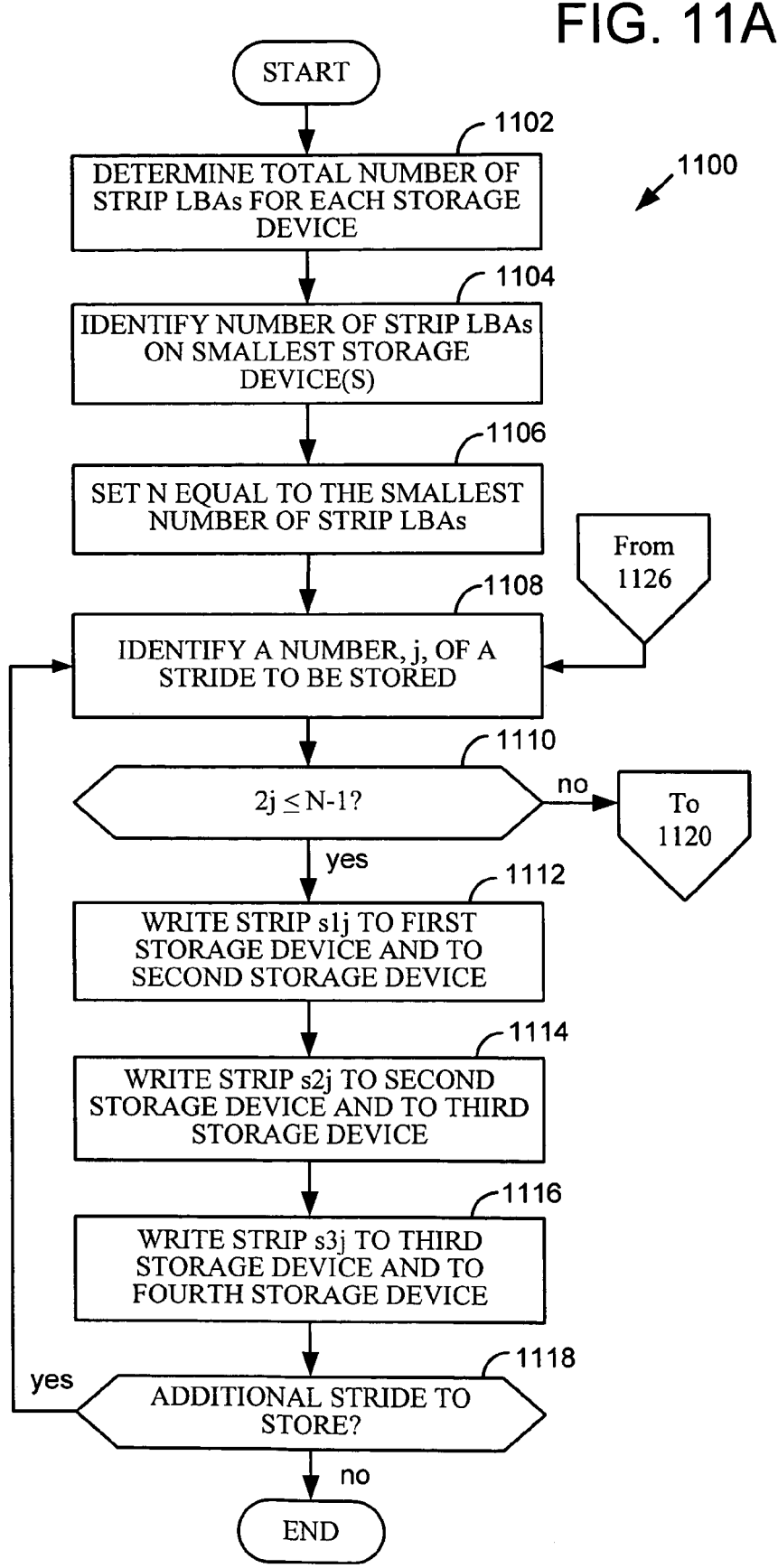
FIGS. 11A–11B are a flowchart of an operational sequence for backing up data in accordance with an example of the invention.

FIG. 11 is a flowchart for a sequence 1100 for a method for storing data in an array of storage devices. Operations of the sequence 1100 may be performed by one or more of the device adapters DA1–8, cluster 102, and/or cluster 104 (and/or host 104). Referring to FIG. 11A, sequence 1100 may include, and may begin with, operation 1102, which comprises determining, for each storage device in an array of storage devices, the total number of strips, identified by their associated Logical Block Addresses (LBAs), that can be stored in the storage device. This may also be described as determining the total number of strip LBAs on each storage device in the array. As an example, the array of storage devices may include some, or all of the storage devices in one or more of the storage device groups 126a–d.

Sequence 1100 may also include operation 1104, which comprises identifying the maximum number of strips that can be stored in the storage device(s) in the array that have the smallest capacity. This may also be described as identifying the number of strip LBAs on the storage device(s) in the array that have the smallest capacity. Sequence 1100 may also include operation 1106, which comprises setting a parameter N equal to the maximum number of strips that can be stored in the smallest capacity storage device(s) in the array, which may also be described as setting N equal to the number of strip LBAs.

For embodiments where the original and one copy of each stride are stored, the operations may also include reserving half of available strip LBAs for primary data, and reserving half of available strip LBAs for rotated copies of data. For embodiments where the original and two copies of each stride are stored, the operations may also include reserving one third of available strip LBAs for primary data, and reserving two thirds of available strip LBAs for rotated copies of data. The reservation of storage space may be implicitly carried out by a storage device adapter DA1–8, for example by using a one-to-one mapping algorithm and table, such as those shown in FIGS. 5–10. Generally, in response to a request to write data received from a cluster 102, 104, (or host 124) a storage device adapter DA1–8 performs the write of the primary copy of the data and any secondary copies, and also keeps track of what is written and where it is written, for example, by using a mapping table.

Sequence 1100 may also include operation 1108, which comprises identifying a number, j, of a stride Sj to be stored. Sequence 1100 may also include operation 1110, which comprises, for an example where an original and a single copy of each strip are stored, determining if $2j$ is less than or equal to N−1. If in operation 1110 it is determined that $2j$ is less than or equal to N−1, then the sequence 1100 may include one or more of operations 1112, 1114, 1116, and 1118. Operation 1112 comprises writing a strip s1j to a LBA in a first storage device in the array, for example LBAj, and to a LBA in a second storage device in the array, for example LBAj+1. As an example, the first and second storage devices may be included in the storage device groups 126a–d. Operation 1114 comprises writing a strip s2j to a LBA in the second storage device, for example LBAj, and to a LBA in a third storage device in the array, for example LBAj+1. Operation 1116 comprises writing a strip s3j to a LBA in the third storage device, for example LBAj, and to a LBA in a fourth storage device in the array, for example LBAj+1. The strips s1j, s2j, s3j may be members of the stride j identified in operation 1108. One or more of the strips s1j, s2j, s3j may be a parity strip. Further, if the stride j has additional strips, additional strips in the stride j may be stored. For example, a strip s4j may be written to a LBA in the fourth storage device in the array, for example LBAj, and to a LBA in a fifth storage device in the array, for example LBAj+1, and a strip s5j may be written to a LBA in the fifth storage device, for example LBAj, and to a LBA in a sixth storage device in the array, for example LBAj+1, and a strip s6j may be written to a LBA in the sixth storage device, for example LBAj, and to a LBA in the first storage device, for example LBAj+1. One or more of the strips s1j, s2j, s3j, s4j, s5j, s6j may be a parity strip. In other embodiments, greater than or less than 3 strips of the stride j, or greater than or less than 6 strips of the stride j, may be written to storage devices in a similar manner, wherein each strip is written to two or more storage devices.

Operation 1118 comprises determining if there is an additional stride to store in the array, and if there is, one or more of operations 1108 to 1118 may be performed again. If in operation 1118 it is determined that there is not an additional stride to store, the sequence 1100 may end.

In an alternative embodiment, operation 1110 may comprise determining if $3j$ is less than N−1. In this alternative embodiment, if in operation 1110 it is determined that $3j$ is less than N−1, then the sequence 1100 may include alternative embodiments of operations 1112, 1114, 1116, and 1118. For example, operation 1112 may comprise writing the strip s1j to a LBA in a first storage device in the array, for example LBAj, and to a LBA in a second storage device in the array, for example LBAj+2, and to a third a third storage device in the array, for example LBAj+1. In this alternative embodiment, operation 1114 may comprise writing a strip s2j to a LBA in the second storage device, for example LBAj, and to a LBA in the third storage device, for example LBAj+2, and to a LBA in a fourth storage device in the array, for example LBAj+1. In this alternative embodiment, operation 1116 may comprise writing the strip s3j to a LBA in the third storage device, for example LBAj, and to a LBA in the fourth storage device, for example LBAj+2, and to a LBA in a fifth storage device in the array, for example LBAj+1. In this alternative embodiment, additional strips in the stride j may be stored in a similar manner. For example, a strip s4j may be written to a LBA in the fourth storage device in the array, for example LBAj, and to a LBA in the fifth storage device in the array, for example LBAj+2, and to a LBA in a sixth storage device in the array, for example LBAj+1; and a strip s5j may be written to a LBA in the fifth storage device, for example LBAj, and to a LBA in a sixth storage device in the array, for example LBAj+2, and to a LBA the first storage device in the array, for example LBAj+1; and a strip s6j may be written to a LBA in the sixth storage device, for example LBAj, and to a LBA in the first storage device, for example LBAj+2, and to a LBA in the second storage device, for example LBAj+1. In other embodiments, the stride j may have a number of strips that is greater than or less than 3 (or greater or less than 6), and in these embodiments the strips of the stride j may be written to storage devices in the manner described in operations 1112, 1114, 1116, wherein each strip is written to three storage devices. In other alternative embodiments, additional copies of each stride could be stored in a similar manner. Operation 1118 comprises determining if there is an additional stride to store in the array, and if there is, one or more of operations 1108 to 1118 may be performed again as described above for this alternative embodiment. If in operation 1118 it is determined that there is not an additional stride to store, the sequence 1100 may end.

Figure 11B:
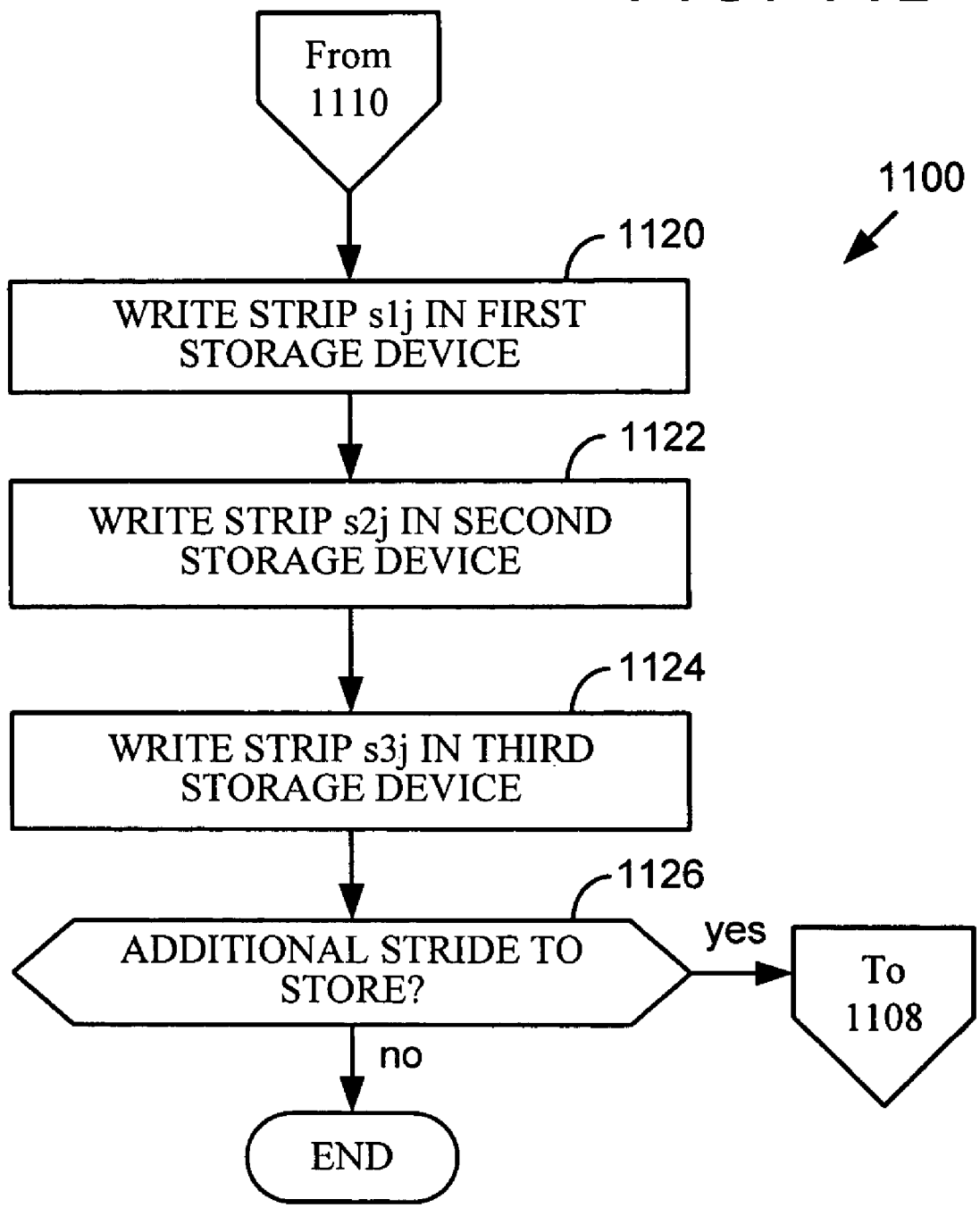

Referring again to the primary embodiment illustrated in FIGS. 11A–B, wherein an original copy and one additional copy of each stride is written, if in operation 1110 it is determined that 2j is not less than or equal to N−1, then the sequence 1100 may include one or more of operations 1120, 1122, 1124, and 1126. Referring to FIG. 11B, operation 1120 comprises writing the strip s1j to a LBA in the first storage device, for example LBA(2j−N+1). Operation 1122 comprises writing the strip s2j to a LBA in the second storage device, for example LBA(2j−N+1). Operation 1124 comprises writing the strip s3j to a LBA in the third storage device, for example LBA(2j−N+1). If there are additional strips in the stride j, they may be stored in a similar manner. For example, a strip s4j may be written to a LBA in the fourth storage device, for example LBA(2j−N+1), and a strip s5j may be written to an LBA in the fifth storage device, for example LBA(2j−N+1), a strip s6j may be written to a LBA in the sixth storage device, for example LBA(2j−N+1). In other embodiments, the stride j may have a number of strips that is greater than or less than 3 (or greater or less than 6), and in these embodiments the strips of the stride j may be written to storage devices in the manner described in operations 1120, 1122, and 1124. Operation 1126 comprises determining if there is an additional stride to store in the array, and if the is, one or more of operations 1108–1126 may be performed again. If there is not an additional stride to store, the sequence 1100 may end.

In the alternative embodiment wherein operation 1110 comprises determining whether 3j is less than N−1, if 3j is not less than N−1, then the sequence 1100 may include alternative embodiments of operations 1120, 1122, 1124, and 1126. For example, referring to FIG. 11B, operation 1120 may comprise writing the strip s1j to a LBA in the first storage device, for example LBA(3j−N+2). In this alternative embodiment, operation 1122 may comprise writing the strip s2j to a LBA in the second storage device, for example LBA(3j−N+2). Also, in this alternative embodiment, operation 1124 may comprise writing the strip s3j to a LBA in the third storage device, for example LBA(3j−N+2). If there are additional strips in the stride j, they may be stored in a similar manner. For example, a strip s4j may be written to a LBA in the fourth storage device, for example LBA(3j−N+2), and a strip s5j may be written to an LBA in the fifth storage device, for example LBA(3j−N+2), and a strip s6j may be written to a LBA in the sixth storage device, for example LBA(3j−N+2). In other embodiments, the stride j may have a number of strips that is greater than or less than 3 (or greater or less than 6), and in these embodiments the strips of the stride j may be written to storage devices in the manner described in operations 1120, 1122, and 1124 for this alternative embodiment. Operation 1126 comprises determining if there is an additional stride to store in the array, and if the is, one or more of operation 1108–1126 may be performed again as described for this alternative embodiment. If there is not an additional stride to store, the sequence 1100 may end.

One example of the sequence discussed above may be summarized as follows: The process may be carried out on an array of m disk drives with N available LBAs, wherein each stride S is composed of m strips (s1, s2, . . . $s_m$) including a parity strip: Sj=(s1j+s2j+ . . . +smj). A new stride Sj is written starting at LBAj, wherein j=0, 1, 2, . . . N−1, wherein N=the number of available LBAs for recording, including metadata. A variable n may be set equal to 2j. To store the data in the desired pattern, if n is less than or equal to N−1, then starting at LBAn, write s1j and smj to disk 1, then write s2j and s1j to disk 2, . . . and write smj and s(m−1)j to disk m. If n is greater than N−1, then starting at LBA (n−N+1), write s1j to disk 1, write s2j to disk 2, . . . and write smj to disk m. The preceding process is merely one example, and the pattern for writing the data and the copies of the data could be generalized with other storage patterns that also have a one-to-one mapping.

C. Additional Discussion

The secondary copies that are utilized in different examples of the invention may be written using various techniques. For example, one or more of the device adapters DA1–8 attached to the RAID array may be used to make the array copies in real time mode. In real time, the device adapter buffer may be used to hold the prior data strip and destage it paired with the original data strip targeted for the array member. New primary data strides may be written over the oldest of the copy strips when there is no space left to make dual copies of new data. Each new stride further encroaches on the space formerly allocated to the copies in a sequentially FIFO manner. The primary strides of the old data whose copies have been overwritten remain untouched so the RAID protection offered by the base RAID code is still guaranteed. The primary strides whose copies have not yet been overwritten continue to have the higher redundancy protection. Eventually all of the copy strides will be overwritten, leaving the minimum base RAID protection.

Rather than writing the copies of the data in real time, one or more device adapters DA1–8 attached to the RAID array may be used to make the array copies in background mode. In background mode, the device adapter DA1–8 could read the strips from each array member and write them in a shifted sequence relative to the original stride.

Some examples of the invention comprise striping a dual or higher set of copies of RAID strides across a given number of disks. Each primary stride is composed of m sequential strips and each strip is written to one of the m drives in the array. At least one of the strips may be a parity strip constructed, for example, by XORing the remaining strips. Secondary copies of the strips in the primary stride are rotated with respect to the disks in the array to provide secondary quasi-physical mirror(s) of the disks in the array.

FIG. 12 shows an example of an implementation of the invention wherein a single copy of each stride is made for a six disk array, wherein RAID 5 is the base array. Other parity RAID schemes (RAID 51, Double Parity, etc.) could also be enhanced with this redundancy increase (or with further redundancy such as double or triple mirroring in other embodiments of the invention). The primary storage strides are designated as A, B, C . . . , and a copy, secondary set of strides that have been rotated by one drive (i.e. a stretch equal to one), are designated A', B, C' . . . . Thus, A', B', and C' are secondary data strides which are mirror images of their unprimed counterparts A, B, C. As mentioned above, additional copies could be used to provide higher redundancy, such as a second (or third) copy also rotated by one drive (or rotated by some other number of drives). Each stride in this example has a parity strip, for example Ap, which represents the parity strip associated with the data strips A1, A2, A3, A4 and A5. Thus, A1, B1, C1, . . . , for i=1, 2, 3, 4, 5 are primary data strips, and Ap, Bp, Cp . . . are the associated parity strips. In this example both primary and secondary strips have a respective stretch of 1 (each successive stride is rotated by one disk). However, other stretches, for example 2, 3, 4, or 5, could be used.

FIG. 13 shows an example of a rebuild after a one disk failure without using parity reconstruction (parity recovery) of lost data. Each lost strip is rebuilt on a spare drive by copying from adjacent drives, starting with a rebuild of primary strips A2, B1, Cp, . . . from secondary strips A'2, B'1, C'p, . . . .

FIG. 14 shows an example of a rebuild after two non-adjacent disk failures, without using parity reconstruction. This figure illustrates the ability to recover from any two non adjacent failures, which is a higher tolerance than base RAID 5. Each strip is rebuilt on spare drives by copying from adjacent drives. For example, first primary strips A2, B1, Cp, . . . are rebuilt from secondary strips A'2, B'1, C'p, . . . , followed by rebuild of primary strips on the second spare A4, B3, C2, . . . . In this example, data reconstruction using parity strips Ap, Bp, Cp . . . is not needed, because the failed drives are non-adjacent.

Figure 15:
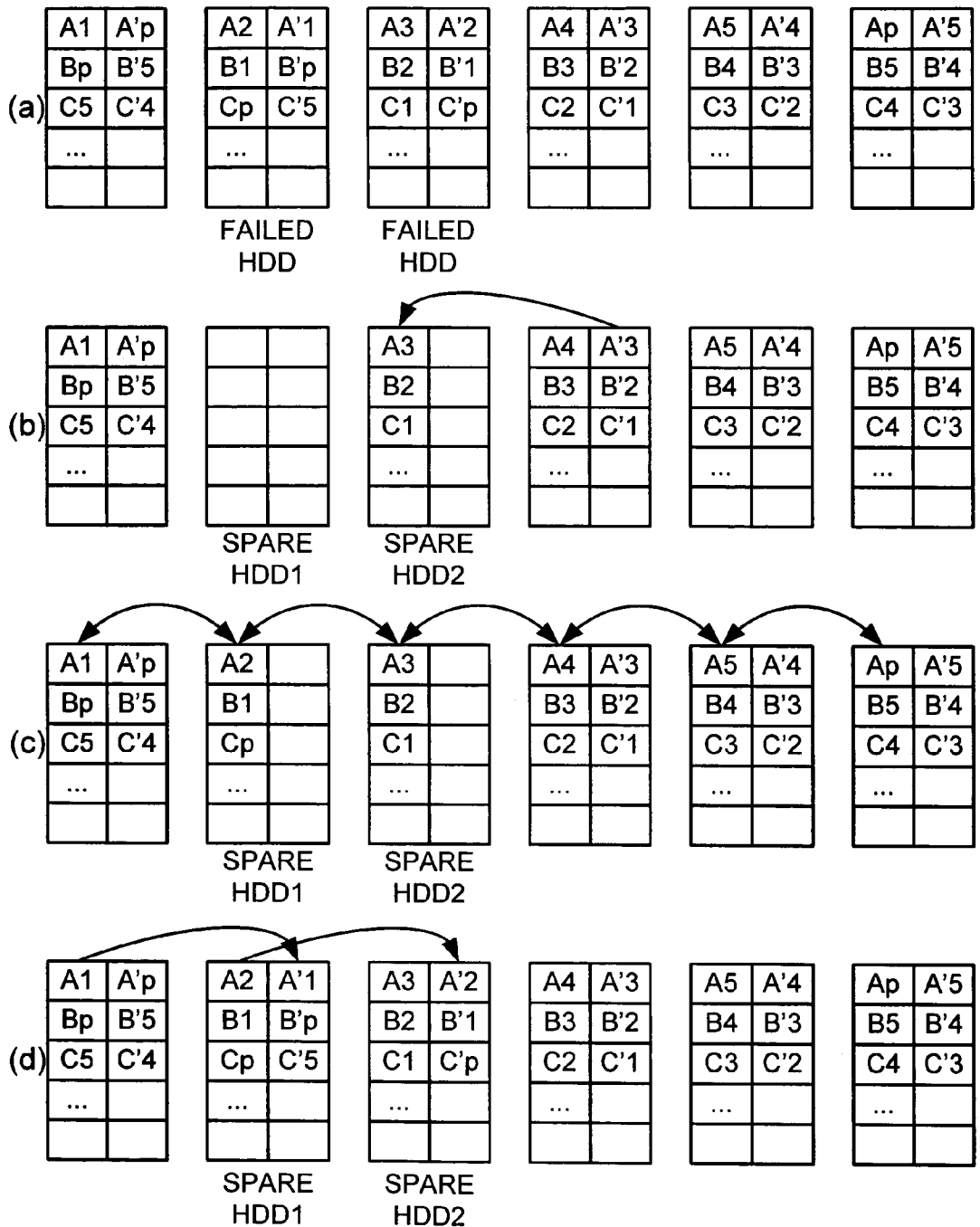
FIG. 15 is a representation of a rebuild of data in a disk array in accordance with an example of the invention.

FIG. 15 shows an example of a rebuild after two adjacent disk failures, wherein parity reconstruction is utilized. This figure illustrates the ability to recover from any two failures, even when the failures are adjacent, which is a higher tolerance than base RAID 5. The rebuild uses parity reconstruction minimized to one spare disk drive's primary strip. In FIG. 15, depiction (a) identifies the two failed drives in the array. Depiction (b) shows that primary strips are recovered by copying from an adjacent drive. Depiction (c) shows that primary strips A2, B1, Cp, . . . are reconstructed using parity reconstruction. Depiction (d) shows that secondary strips A' 1, B'p, C'5, . . . are recovered by copying from adjacent spare secondary strips A1, Bp, C5, . . . on an adjacent hard disk drive, and that secondary strips A'2, B'1, C'p, . . . are recovered by copying from adjacent spare secondary strips A2, B1, Cp, . . . on an adjacent hard disk drive.

As described herein for some examples of the invention, for a given number of disks in a RAID array, the use of rotated copies of the primary RAID strides provides a higher drive fault tolerance (redundancy) than the base RAID.

Some examples of the invention also provide a self tuning process for optimum redundancy that progressively reduces the drive fault tolerance to a level no worse than the base RAID array as the primary RAID storage overlaps the secondary copies (or tertiary or other numbers of copies in other embodiments). Some examples of the invention provide an autonomic RAID system wherein a given number of disks provide greater self protection for customer data than in a base RAID system, and that tune the self protection as the amount of used disk space grows, and that provide efficient self healing when one or more drives fail.

For a given number of disk drives in a RAID array, some examples of the invention exploit free disk space to increase the effective drive fault tolerance of the RAID array through redundancy recording above that provided by the base RAID code. For a set number of array drives, each RAID copy provides 1 more drive fault tolerance than the base RAID. For example, for a 6 member array with RAID 5 base code, when the invention is not used, data may be recovered only if no more than one drive member fails. In contrast, with some examples of the invention, wherein there is a single copy of rotated RAID strips, data may be recovered even if two drive members fail. With examples of the invention wherein two copies of rotated RAID strips are saved, data may be recovered even when 3 disk failures occur concurrently.

Some examples of the invention provide higher RAID protection during the early usage of a RAID array, which is when protection is most needed and the most free space is available. The early usage of a new disk array has exposure to data loss because the infant mortality rate of new hard disk drives (HDDs) is higher than the HDD failure rate after the drives have been running for many Power On Hours (POHs).

Some example of the invention allow the use of 100% of the effective data capacity of a base RAID array for a given number of disks in the array. This comes at the price of gradually exposing older (customer) data to the fault tolerance of the base RAID code. The array disk fault tolerance monotonically decreases with additional disk space usage but never goes below the fault tolerance of the primary RAID. Hence the protection of data is always at least that of the base RAID code.

With some examples of the invention, the rotated copies of the data, beginning with the oldest data, will eventually be written over by new (customer) data, and therefore only the primary data will remain. For the subset of data for which only the primary data remains, RAID 5, for example, would allow only 1 disk failure for data recovery. The data in the array for which the rotated copy has not been written over by new data, will still have the higher disk fault tolerance. The subset of data for which only the primary data remains will grow as additional customer data is stored in the array, until all the data capacity of the array has been used. In some examples, if an operating system wants to write to the location of existing secondary copy, and if the disk is not full, the storage device adapter DA1–8 may move the existing secondary copy to another location, or may reassign storage locations without reading and re-storing the previously stored secondary copy.

Figure 16:
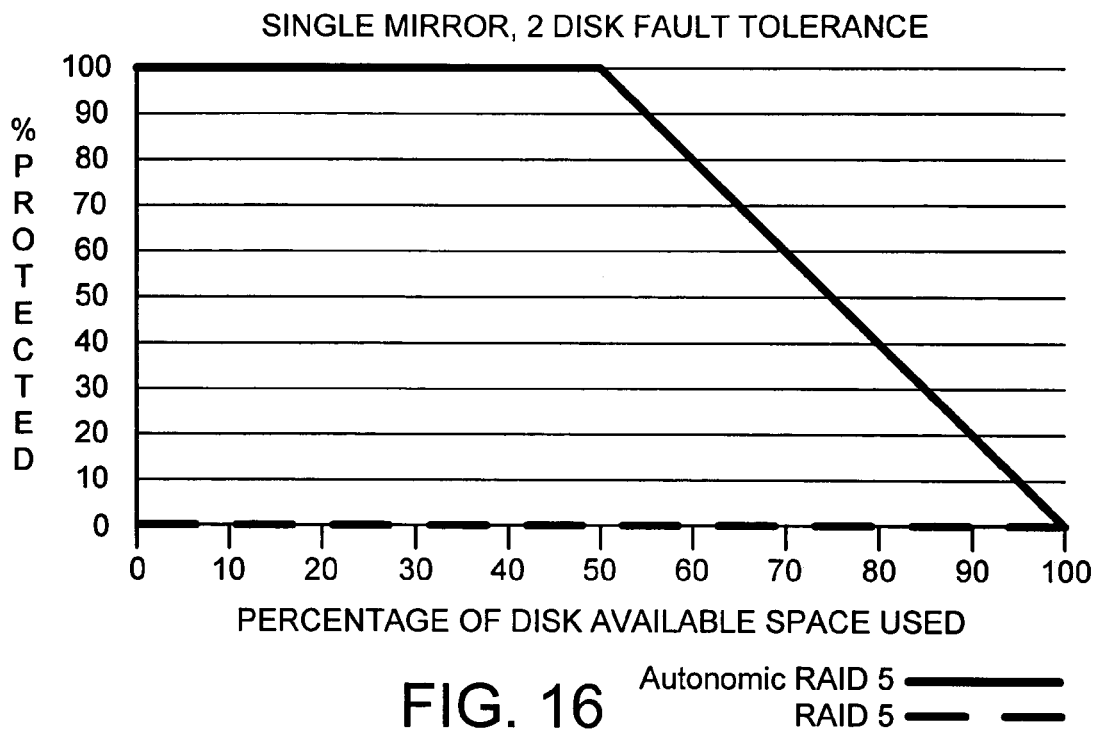
FIG. 16 is graph showing the percentage of data protected for any two hard disk drive failures in accordance with an example of the invention with one rotated copy.

The protection for a "single mirror" (one rotated copy of each strip), for RAID 5 is shown in FIG. 16. More specifically, FIG. 16 shows the percent of data protected for any two hard disk drive failures, for "autonomic RAID 5" in accordance with an example of the invention wherein a single mirror is utilized. Generally, some examples of the invention may be called "RAID storage for autonomic customer data protection". When used with RAID 5, some examples of the invention may be called "autonomic RAID 5". As shown in FIG. 16, two disk fault tolerance exists for all data until fifty percent of the available disk space has been used. In contrast, the fault protection of base RAID 5 is represented by the zero percent horizontal line at the bottom of FIG. 16. Thus, this single mirror example provides a maximum of two disk fault tolerance, which is a significant improvement over the single disk fault tolerance of base RAID 5.

Figure 17:
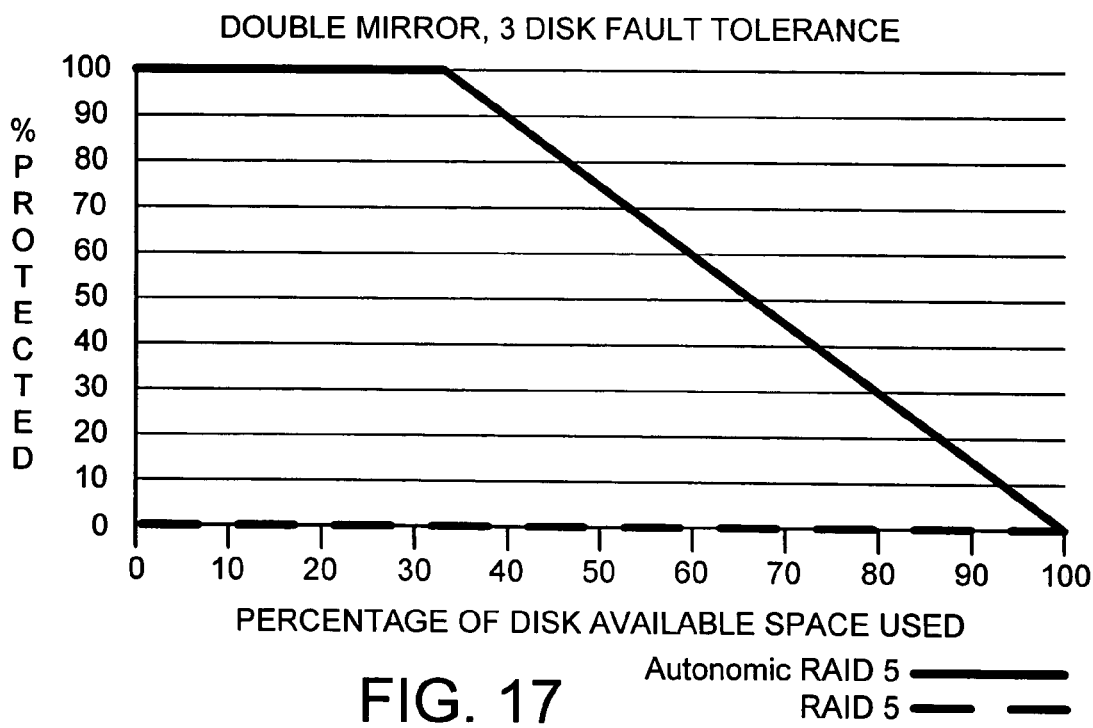
FIG. 17 is graph showing the percentage of data protected for any three hard disk drive failures in accordance with an example of the invention with two rotated copies.

The protection for a "double mirror"(two rotated copies of each strip), is shown in FIG. 17. More specifically, FIG. 17 shows the percent of data protected for any three hard disk drive failures, for "autonomic RAID 5" in accordance with an example of the invention wherein a double mirror is utilized. As shown in FIG. 17, three disk fault tolerance exists for all data until approximately 33.3 percent of the available disk space has been used. In contrast, the fault protection of base RAID 5 is represented by the zero percent horizontal line at the bottom of FIG. 17. Thus, this double mirror example provides a maximum of three disk fault tolerance, which is a significant improvement over the single disk fault tolerance of base RAID 5.

Some examples of the invention provide additional RAID robustness against (customer) data loss during rebuild by significantly reducing the rebuild time in the event of one or more drive failures. As an example, data loss may occur as the result of an array loss or the loss of one or more strips (which may be called killstrip). The secondary copies provided by examples of the invention either eliminate recovering lost primary data via parity recovery or substantially reduce the number of times parity recovery needs to be used to recover primary data, depending on the number of failures and whether failures occur on adjacent drives. Some examples of the invention reduce the rebuild time because the time required to copy strips from the surviving disks onto a hot spare is much less than the time required to reconstruct each lost strip via parity reconstruction by reading the strips on each of the surviving drives in a stride and then XORing the data to recover the missing strips.

Some examples of the invention also are also faster than a Preemptive reconstruct, for reading data, in the event that one of the drives is slow in responding to a read request. Data can be read faster because a copy of data in a lost strip can be read from the adjacent drive, along with the primary strip, rather than reading all the remaining data strips in a stride and XORing them with the parity strip to reconstruct the data in the slow-to-respond-strip.

III. OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A computer-readable medium tangibly embodying a program of machine-readable instructions executable by a digital processing apparatus to perform operations for storing data in an array of storage devices, the operations comprising:

writing a first strip to a first storage device and a second storage device;

writing a second strip to the second storage device and a third storage device;

writing a third strip to a third storage device and a fourth storage device;

determining a maximum strip LBA for the array of storage devices;

reserving half of available strip LBAs for primary data; and reserving half of available strip LBAs for rotated copies of data.

2. A computer-readable medium tangibly embodying a program of machine-readable instructions executable by a digital processing apparatus to perform operations for storing data in an array of storage devices, the operations comprising:

writing a first strip to a first storage device, and to a second storage device, and to a third storage device;

writing a second strip to the second storage device, and to the third storage device, and to a fourth storage device;

writing a third strip to the third storage device, and to the fourth storage device, and to a fifth storage device;

determining a maximum strip LBA for the array of storage devices;

reserving at least 33 percent of available strip LBAs for primary data; and reserving at least 66 percent of available strip LBAs for rotated copies of data.

3. A signal computer-readable medium tangibly embodying a program of machine-readable instructions executable by a digital processing apparatus to perform operations for storing data in an array of storage devices, the operations comprising:

setting a value for a parameter N, wherein each storage device in the array of storage devices has at least N strip LBAs;

identifying a number, j, of a stride to be stored;

determining if $2j$ is less than or equal to N−1;

and if so:

writing a strip $s1j$ to a LBA in a first storage device in the array, and to a LBA in a second storage device in the array;

writing a strip $s2j$ to a LBA in the second storage device, and to a LBA in a third storage device in the array; and writing a strip $s3j$ to a LBA in the third storage device, and to a LBA in a fourth storage device in the array.

4. The computer-readable medium of claim 3, wherein if it is determined that $2j$ is not less than or equal to N−1, then the operations further comprise:

writing the strip $s1j$ to a LBA in the first storage device;

writing the strip $s2j$ to a LBA in the second storage device; and writing the strip $s3j$ to a LBA in the third storage device.

5. The computer-readable medium of claim 3, wherein the operations further comprise:

determining, for each storage device in the array of storage devices, the total number of strip LBAs in the storage device; and identifying the smallest total number of strip LBAs;

and wherein the operation of setting a value for the parameter N comprises setting N equal to the smallest total number of strip LBAs.

6. The computer-readable medium of claim 3, wherein at least one of the strips is a parity strip.

7. The computer-readable medium of claim 3, wherein if it is determined that $2j$ is less than or equal to N−1, then the operations further comprise:
    writing a strip $s4j$ to a LBA in the fourth storage device, and to a LBA in a fifth storage device in the array;
    writing a strip $s5j$ to a LBA in the fifth storage device, and to a LBA in a sixth storage device in the array; and
    writing a strip $s6j$ to a LBA in the sixth storage device, and to a LBA in the first storage device.

8. The computer-readable medium of claim 3, wherein if it is determined that $2j$ is not less than or equal to N−1, then the operations further comprise:
    writing the strip $s4j$ to a LBA in the fourth storage device;
    writing the strip $s5j$ to a LBA in the fifth storage device; and
    writing the strip $s6j$ to a LBA in the sixth storage device.

9. A computer-readable medium tangibly embodying a program of machine-readable instructions executable by a digital processing apparatus to perform operations for storing data in an array of storage devices, the operations comprising:
    setting a value for a parameter N, wherein each storage device in the array of storage devices has at least N strip LBAs;
    identifying a number, j, of a stride to be stored;
    determining if $2j$ is less than or equal to N−1;
    and if so:
    writing a strip $s1j$ to a strip LBAj in a first storage device in the array, and to a strip LBAj+1 in a second storage device in the array;
    writing a strip $s2j$ to a strip LBAj in the second storage device, and to a strip LBAj+1 in a third storage device in the array; and
    writing a strip $s3j$ to a strip LBAj in the third storage device, and to a strip LBAj+1 in a fourth storage device in the array.

10. The computer-readable medium of claim 9, wherein if it is determined that $2j$ is not less than or equal to N−1, then the operations further comprise:
    writing the strip $s1j$ to strip LBA($2j$−N+1) in the first storage device;
    writing the strip $s2j$ to strip LBA($2j$−N+1) in the second storage device; and
    writing the strip $s3j$ to strip LBA($2j$−N+1) in the third storage device.

11. The computer-readable medium of claim 9, wherein the operations further comprise:
    determining, for each storage device in the array of storage devices, the total number of strip LBAs in the storage device; and
    identifying the smallest total number of strip LBAs;
    and wherein the operation of setting a value for the parameter N comprises setting N equal to the smallest total number of strip LBAs.

12. The computer-readable medium of claim 9, wherein at least one of the strips is a parity strip.

13. The computer-readable medium of claim 9, wherein if it is determined that $2j$ is less than or equal to N−1, then the operations further comprise:
    writing a strip $s4j$ to a strip LBAj in the fourth storage device in the array, and to a strip LBAj+1 in a fifth storage device in the array;
    writing a strip $s5j$ to a strip LBAj in the fifth storage device, and to a strip LBAj+1 in a sixth storage device in the array; and
    writing a strip $s6j$ to a strip LBAj in the sixth storage device, and to a strip LBAj+1 in the first storage device.

14. The computer-readable medium of claim 9, wherein if it is determined that $2j$ is not less than or equal to N−1, then the operations further comprise:
    writing the strip $s4j$ to strip LBA($2j$−N+1) in the fourth storage device;
    writing the strip $s5j$ to strip LBA($2j$−N+1) in the fifth storage device; and
    writing the strip $s6j$ to strip LBA($2j$−N+1) in the sixth storage device.

15. A computer-readable medium tangibly embodying a program of machine-readable instructions executable by a digital processing apparatus to perform operations for storing data in an array of storage devices, the operations comprising:
    setting a value for a parameter N, wherein each storage device in the array of storage devices has at least N strip LBAs;
    identifying a number, j, of a stride to be stored;
    determining if $3j$ is less than N−1;
    and if so:
    writing a strip $s1j$ to a LBA in a first storage device in the array, and to a LBA in a second storage device in the array, and to a LBA in a third storage device in the array;
    writing a strip $s2j$ to a LBA in the second storage device, and to a LBA in the third storage device, and to a LBA in a fourth storage device in the array; and
    writing a strip $s3j$ to a LBA in the third storage device, and to a LBA in the fourth storage device, and to a LBA in a fifth storage device in the array.

16. The computer-readable medium of claim 15, wherein if it is determined that $3j$ is not less than N−1, then the operations further comprise:
    writing the strip $s1j$ to a LBA in the first storage device;
    writing the strip $s2j$ to a LBA in the second storage device; and
    writing the strip $s3j$ to a LBA in the third storage device.

17. The computer-readable medium of claim 15, wherein the operations further comprise:
    determining, for each storage device in the array of storage devices, the total number of strip LBAs in the storage device; and
    identifying the smallest total number of strip LBAs;
    and wherein the operation of setting a value for the parameter N comprises setting N equal to the smallest total number of strip LBAs.

18. The computer-readable medium of claim 15, wherein at least one of the strips is a parity strip.

19. The computer-readable medium of claim 15, wherein if it is determined that $3j$ is less than N−1, then the operations further comprise:
    writing a strip $s4j$ to a LBA in the fourth storage device, and to a LBA in the fifth storage device, and to a LBA in a sixth storage device in the array;
    writing a strip $s5j$ to a LBA in the fifth storage device, and to a LBA in the sixth storage device, and to a LBA in the first storage device; and
    writing a strip $s6j$ to a LBA in the sixth storage device, and to a LBA in the first storage device, and to a LBA in the second storage device.

20. The computer-readable medium of claim 15, wherein if it is determined that $3j$ is not less than N−1, then the operations further comprise:
    writing the strip $s4j$ to a LBA in the fourth storage device;
    writing the strip $s5j$ to a LBA in the fifth storage device;
    writing the strip $s6j$ to a LBA in the sixth storage device.

21. A computer-readable medium tangibly embodying a program of machine-readable instructions executable by a digital processing apparatus to perform operations for storing data in an array of storage devices, the operations comprising:
setting a value for a parameter N, wherein each storage device in the array of storage devices has at least N strip LBAs;
identifying a number, j, of a stride to be stored;
determining if $3j$ is less than N−1;
and if so:
writing a strip s1$j$ to a LBA$j$ in a first storage device in the array, and to a LBA$j$+2 in a second storage device in the array, and to a LBA$j$+1 in a third storage device in the array;
writing a strip s2$j$ to a LBA$j$ in the second storage device, and to a LBA$j$+2 in the third storage device, and to a LBA$j$+1 in a fourth storage device in the array; and
writing a strip s3$j$ to a LBA$j$ in the third storage device, and to a LBA$j$+2 in the fourth storage device, and to a LBA$j$+1 in a fifth storage device in the array.

22. The computer-readable medium of claim 21, wherein if it is determined that $3j$ is not less than N−1, then the operations further comprise:
writing the strip s1$j$ to LBA($3j$−N+2) in the first storage device;
writing the strip s2$j$ to LBA($3j$−N+2) in the second storage device; and
writing the strip s3$j$ to LBA($3j$−N+2) in the third storage device.

23. The computer-readable medium of claim 21, wherein the operations further comprise:
determining, for each storage device in the array of storage devices, the total number of strip LBAs in the storage device; and
identifying the smallest total number of strip LBAs;
and wherein the operation of setting a value for the parameter N comprises setting N equal to the smallest total number of strip LBAs.

24. The computer-readable medium of claim 21, wherein at least one of the strips is a parity strip.

25. The computer-readable medium of claim 21, wherein if it is determined that $3j$ is less than N−1, then the operations further comprise:
writing a strip s4$j$ to a LBA$j$ in the fourth storage device, and to a LBA$j$+2 in the fifth storage device, and to a LBA$j$+1 in a sixth storage device in the array;
writing a strip s5$j$ to a LBA$j$ in the fifth storage device, and to a LBA$j$+2 in the sixth storage device, and to a LBA$j$+1 in the first storage device in the array; and
writing a strip s6$j$ to a LBA$j$ in the sixth storage device, and to a LBA$j$+2 in the first storage device, and to a LBA$j$+1 in the second storage device.

26. The computer-readable medium of claim 21, wherein if it is determined that $3j$ is not less than N−1, then the operations further comprise:
writing the strip s4$j$ to LBA($3j$−N+2) in the fourth storage device;
writing the strip s5$j$ to LBA($3j$−N+2) in the fifth storage device; and
writing the strip s6$j$ to LBA($3j$−N+2) in the sixth storage device.

27. A storage system, comprising:
a memory; and
a processing device coupled to the memory, wherein the processing device is programmed to perform operations for storing data in an array of storage devices, the operations comprising:
setting a value for a parameter N, wherein each storage device in the array of storage devices has at least N strip LBAs;
identifying a number, j, of a stride to be stored;
determining if $2j$ is less than or equal to N−1;
and if so:
writing a strip s1$j$ to a LBA in a first storage device in the array, and to a LBA in a second storage device in the array;
writing a strip s2$j$ to a LBA in the second storage device, and to a LBA in a third storage device in the array; and
writing a strip s3$j$ to a LBA in the third storage device, and to a LBA in a fourth storage device in the array.

28. The storage system of claim 27, wherein if it is determined that $2j$ is not less than or equal to N−1, then the operations further comprise:
writing the strip s1$j$ to a LBA in the first storage device;
writing the strip s2$j$ to a LBA in the second storage device; and
writing the strip s3$j$ to a LBA in the third storage device.

29. A storage system, comprising:
a memory; and
a processing device coupled to the memory, wherein the processing device is programmed to perform operations for storing data in an array of storage devices, the operations comprising:
setting a value for a parameter N, wherein each storage device in the array of storage devices has at least N strip LBAs;
identifying a number, j, of a stride to be stored;
determining if $2j$ is less than or equal to N−1;
and if so:
writing a strip s1$j$ to a LBA$j$ in a first storage device in the array, and to a LBA$j$+1 in a second storage device in the array;
writing a strip s2$j$ to a LBA$j$ in the second storage device, and to a LBA$j$+1 in a third storage device in the array; and
writing a strip s3$j$ to a LBA$j$ in the third storage device, and to a LBA$j$+1 in a fourth storage device in the array.

30. The storage system of claim 29, wherein if it is determined that $2j$ is not less than or equal to N−1, then the operations further comprise:
writing the strip s1$j$ to LBA($2j$−N+1) in the first storage device;
writing the strip s2$j$ to LBA($2j$−N+1) in the second storage device; and
writing the strip s3$j$ to LBA($2j$−N+1) in the third storage device.

31. A storage system, comprising:
a memory; and
a processing device coupled to the memory, wherein the processing device is programmed to perform operations for storing data in an array of storage devices, the operations comprising:
setting a value for a parameter N, wherein each storage device in the array of storage devices has at least N strip LBAs;
identifying a number, j, of a stride to be stored;
determining if $3j$ is less than N−1;
and if so:

writing a strip s1*j* to a LBA in a first storage device in the array, and to a LBA in a second storage device in the array, and to a LBA in a third storage device in the array;

writing a strip s2*j* to a LBA in the second storage device, and to a LBA in the third storage device, and to a LBA in a fourth storage device in the array; and writing a strip s3*j* to a LBA in the third storage device, and to a LBA in the fourth storage device, and to a LBA in a fifth storage device in the array;

and if not:

writing the strip s1*j* to a LBA in the first storage device;

writing the strip s2*j* to a LBA in the second storage device; and writing the strip s3*j* to a LBA in the third storage device.

32. A storage system for storing data in an array of storage devices, comprising:

means for setting a value for a parameter N, wherein each storage device in the array of storage devices has at least N strip LBAs;

means for identifying a number, j, of a stride to be stored;

means for determining if $2j$ is less than or equal to $N-1$;

and if so:

means for writing a strip s1*j* to a LBA in a first storage device in the array, and to a LBA in a second storage device in the array;

means for writing a strip s2*j* to a LBA in the second storage device, and to a LBA in a third storage device in the array; and means for writing a strip s3*j* to a LBA in the third storage device, and to a LBA in a fourth storage device in the array;

and if not:

means for writing the strip s1*j* to a LBA in the first storage device;

means for writing the strip s2*j* to a LBA in the second storage device; and means for writing the strip s3*j* to a LBA in the third storage device.

* * * * *